(12) United States Patent
Kurokawa et al.

(10) Patent No.: US 11,772,668 B2
(45) Date of Patent: Oct. 3, 2023

(54) VEHICLE CONTROL SYSTEM AND DESIGN METHOD FOR VEHICLE CONTROL SYSTEM

(71) Applicant: Mazda Motor Corporation, Hiroshima (JP)

(72) Inventors: Yoshimasa Kurokawa, Hiroshima (JP); Tetsuhiro Yamashita, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 14 days.

(21) Appl. No.: 17/631,497

(22) PCT Filed: Jul. 20, 2020

(86) PCT No.: PCT/JP2020/028087
§ 371 (c)(1),
(2) Date: Jan. 31, 2022

(87) PCT Pub. No.: WO2021/020206
PCT Pub. Date: Feb. 4, 2021

(65) Prior Publication Data
US 2022/0274612 A1    Sep. 1, 2022

(30) Foreign Application Priority Data

Jul. 31, 2019   (JP) ................. 2019-141108

(51) Int. Cl.
*B60W 50/06*     (2006.01)
*B60R 16/023*    (2006.01)
*H04L 69/08*     (2022.01)

(52) U.S. Cl.
CPC .......... *B60W 50/06* (2013.01); *B60R 16/023* (2013.01); *H04L 69/08* (2013.01)

(58) Field of Classification Search
CPC .. B60W 50/06; B60R 16/023; B60R 16/0231; H04L 69/08; H04L 2012/40273; H04L 12/46; H04L 12/40; H04L 12/2801
See application file for complete search history.

(56) References Cited

U.S. PATENT DOCUMENTS 10,093,232 B2 * 10/2018 Troutman ............. B60T 17/221
2013/0198802 A1 * 8/2013 Ricci ................... G06F 11/2294
                                                          726/28

(Continued)

FOREIGN PATENT DOCUMENTS

JP    2017-61278 A     3/2017
JP    2017-212725 A   11/2017
(Continued)

OTHER PUBLICATIONS

International Search Report and Written Opinion dated Aug. 18, 2020, received for PCT Application PCT/JP2020/028087, Filed on Jul. 20, 2020, 9 pages including English Translation.

*Primary Examiner* — Richard M Camby
(74) *Attorney, Agent, or Firm* — XSENSUS LLP

(57) ABSTRACT

A design method for a vehicle control system includes designing in such a manner that an allowable delay time that is allowed from when operation information is input to an information acquisition unit to when a control signal of an actuator to be operated is output is set in the actuator, and in a case where the allowable delay time is less than a predetermined reference time, an operation-signal generation unit of the actuator is provided in a zone ECU disposed in each predetermined zone of a vehicle and to which the actuator to be operated is connected.

4 Claims, 14 Drawing Sheets

(56) References Cited

U.S. PATENT DOCUMENTS

| | | | |
|---|---|---|---|
| 2013/0204466 A1* | 8/2013 | Ricci | G06F 11/2038 |
| | | | 701/2 |
| 2013/0205412 A1* | 8/2013 | Ricci | G06F 11/0739 |
| | | | 726/29 |
| 2014/0143839 A1* | 5/2014 | Ricci | H04N 21/814 |
| | | | 726/4 |
| 2018/0293891 A1* | 10/2018 | Troutman | G08G 1/13 |
| 2019/0058611 A1 | 2/2019 | Maeda et al. | |
| 2020/0269869 A1 | 8/2020 | Fujihira et al. | |
| 2021/0184886 A1 | 6/2021 | Maeda et al. | |

FOREIGN PATENT DOCUMENTS

| | | |
|---|---|---|
| JP | 2019-12456 A | 1/2019 |
| JP | 2019-23002 A | 2/2019 |
| WO | 2019/116795 A1 | 6/2019 |

\* cited by examiner

VEHICLE CONTROL SYSTEM AND DESIGN METHOD FOR VEHICLE CONTROL SYSTEM

CROSS-REFERENCE TO RELATED APPLICATIONS

The present application is based on PCT/JP2020/028087 filed on Jul. 20, 2020, and claims priority to Japanese Application No. 2019-141108 filed on Jul. 31, 2019, the entire contents of each are incorporated herein by reference.

TECHNICAL FIELD

The technology disclosed herein relates to a vehicle control system and a design method for a vehicle control system.

BACKGROUND ART

Patent Literature 1 discloses a technique in which a plurality of domains divided on the basis of the function of an in-vehicle device are provided, a domain control unit is provided for each domain, and a plurality of the domain control units are controlled by an integrated control unit. In Patent Literature 1, for example, each device control unit is implemented by a single or a plurality of ECUs, and these ECUs are connected by a hierarchical network.

Patent Literature 2 discloses a technique of providing a gateway or a network hub (HUB) that relays data transmission and reception between nodes in different networks in an in-vehicle network system.

CITATION LIST

Patent Literature

Patent Literature 1: JP 2017-61278 A
Patent Literature 2: JP 2017-212725 A

SUMMARY

Technical Problem

Recently, technology development related to vehicle automation (including partial automation) that controls a vehicle on the basis of environment information inside and outside the vehicle, driver information (hereinafter, simply and collectively referred to as "vehicle interior and exterior environment information"), and the like, including an autonomous driving system, has been promoted. In general, in the vehicle automation technology, the vehicle interior and exterior environment information (including information about a driver's operation) is acquired by a camera, a sensor, or the like (hereinafter, simply referred to as "sensor"), arithmetic processing is performed on the basis of the acquired vehicle interior and exterior environment information, and various actuators mounted on the vehicle are controlled on the basis of the arithmetic result. In the future, the arithmetic processing function and the control function of each actuator will be integrated into a central processing unit that integrally manages the operation of the entire vehicle.

Meanwhile, it is not realistic to directly connect the sensors and the actuators to the central processing unit in which functions are integrated as described above, because the number of signal lines increases. Consequently, as in Patent Literature 2, the in-vehicle network in which the electronic control unit (ECU) that functions as a network hub device and/or a gateway device is provided, and communication is performed via the ECU is assumed to be constructed.

In general, in a network system that relays a network hub device and/or a gateway device, it is assumed that a latency occurs when data is transmitted and received, or a protocol conversion time for protocol conversion is generated. In addition, a transmission delay time for transmitting signals to communication paths is generated. That is, a predetermined communication delay time is generated in addition to an arithmetic time for controlling an actuator from when the vehicle interior and exterior environment information is acquired and to when a control signal is output to the actuator.

Then, in a case where the various arithmetic functions and the control function of each actuator are incorporated in the central processing unit, there is a function that cannot make it in time if arithmetic processing is performed by the central processing unit and the actuator is operated on the basis of the arithmetic result.

The technology disclosed herein has been made in view of such a point, and an object thereof is to provide a design method for incorporating a control function of an actuator in a central processing unit.

Solution to Problem

In order to solve the above problem, the technology disclosed herein relates to a design method for a vehicle control system including a plurality of zone ECUs each of which is disposed in each predetermined zone of a vehicle and a central processing unit that integrally controls the zone ECUs, where a method of determining whether an operation-signal generation unit that generates an operation signal for operating each actuator installed in the vehicle on a basis of operation information from an information acquisition unit installed in the vehicle is provided in a first zone ECU to which an actuator to be operated is connected among the zone ECUs or in the central processing unit, the method of determining including designing in such a manner that an allowable delay time that is allowed from when the operation information is input to the information acquisition unit to when a control signal of the actuator to be operated is output is set in the actuator to be operated, and in a case where the allowable delay time is less than a predetermined reference time, the operation-signal generation unit of the actuator to be operated is provided in the first zone ECU.

According to the design method, the predetermined reference time can include a time required for protocol conversion between a communication protocol used for communication between the actuator and each of the zone ECUs and a communication protocol used for communication between each of the zone ECUs and the central processing unit.

According to the design method, it is designed in such a manner that "allowable delay time" is set and in a case where the allowable delay time is less than the predetermined reference time, the operation-signal generation unit of the actuator is provided on a side of the zone ECU. As a result, it is possible to easily separate a function that can be incorporated in the central processing unit and a function that is left on the ECU side without performing complicated arithmetic processing or the like.

Furthermore, the technology disclosed herein relates to a vehicle control system including a plurality of zone ECUs each of which is disposed in each predetermined zone of a vehicle and to each of which an actuator for operating the vehicle is connected and a central processing unit that integrally controls the zone ECUs, the vehicle control system controlling an operation of the actuator on a basis of operation information from an information acquisition unit installed in the vehicle, wherein an allowable delay time that is allowed from when the operation information is input to the information acquisition unit to when a control signal of the actuator is output is set in the actuator, the central processing unit includes a first operation-signal generation unit that operates an actuator with the allowable delay time of a predetermined first reference time or longer among the actuators connected to the zone ECUs, and each of the zone ECUs includes a second operation-signal generation unit that operates an actuator with the allowable delay time less than a second predetermined reference time among the actuators connected to the zone ECUs.

Advantageous Effects

According to the technology disclosed herein, the design method for incorporating the control function of the actuator in the central processing unit is provided.

DESCRIPTION OF EMBODIMENTS

Hereinafter, exemplary embodiments will be described in detail with reference to the drawings. Note that, in the present specification, devices that execute traveling control, such as sensors and/or actuators mounted on a vehicle, are referred to as "in-vehicle devices" or simply "devices".

First Embodiment

Figure 1:
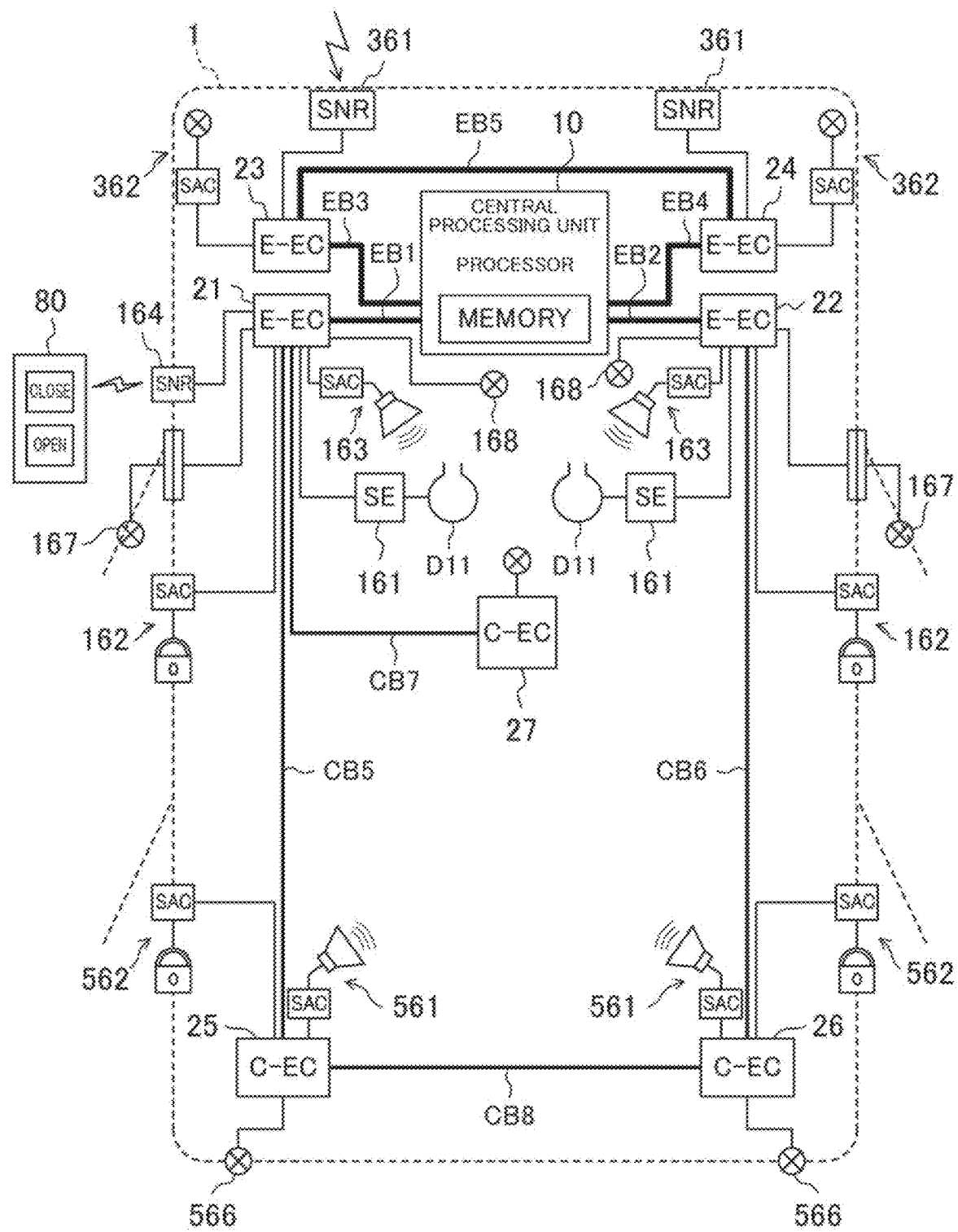
FIG. 1 is a diagram illustrating a configuration example of an in-vehicle network system.

FIG. 1 is a diagram illustrating a configuration example of an in-vehicle network system. The in-vehicle network system illustrated in FIG. 1 is mounted on a vehicle 1 and includes a central processing unit 10 and a plurality of zone ECUs 2. In the in-vehicle network system of the present embodiment, the vehicle 1 is divided into a plurality of (seven in the present embodiment) zones, and each zone includes the zone ECU 2. Although details will be described later, each zone ECU 2 functions as a network hub device having a function to relay information transmitted via a network.

In the following description, the zone ECU 2 disposed in the left dash zone near the left front seat of the vehicle 1 is referred to as "first zone ECU 21", and the zone ECU 2 disposed in the right dash zone near the right front seat of the vehicle 1 is referred to as "second zone ECU 22" in some cases. The zone ECU 2 disposed in the left front zone on the left front side of the vehicle 1 is referred to as "third zone ECU 23", and the zone ECU 2 disposed in the right front zone on the right front side of the vehicle 1 is referred to as "fourth zone ECU 24" in some cases. The zone ECU 2 disposed in the left rear zone on the left rear side of the vehicle 1 is referred to as "fifth zone ECU 25", and the zone ECU 2 disposed in the right rear zone on the right rear side of the vehicle 1 is referred to as "sixth zone ECU 26" in some cases. In some cases, the zone ECU 2 disposed in the console zone near the center console of the vehicle 1 is referred to as "seventh zone ECU 27". Note that when the zone ECUs 21 to 27 are not distinguished, they are simply referred to as "zone ECU 2". When the number of zones is increased or decreased, the number of zone ECUs 2 is also increased or decreased accordingly.

The zone ECU 2 is configured to be able to connect in-vehicle devices such as a smart ECU, a smart actuator, a sensor, and/or an actuator, which will be described later. Note that the present embodiment shows an example in which the zone ECU 2 is provided in each zone, but the present invention is not limited thereto, and for example, the zone ECU for connecting an in-vehicle device corresponding to a specific function can be provided regardless of the zone. In addition, the zone can include a plurality of zone ECUs. Furthermore, the smart ECU can also function as the zone ECU, or the zone ECU can also function as the smart ECU.

In FIG. 1, the first zone ECU 21, the second zone ECU 22, the third zone ECU 23, and the fourth zone ECU 24 have a function as an Ethernet hub device (denoted as "E-EC" in FIG. 1) that transmits and receives Ethernet (registered trademark) signals to and from the central processing unit 10. The central processing unit 10 and the first zone ECU 21 are connected by an Ethernet cable EB1, and the central processing unit 10 and the second zone ECU 22 are connected by an Ethernet cable EB2. The central processing unit 10 and the third zone ECU 23 are connected by an Ethernet cable EB3, the central processing unit 10 and the fourth zone ECU 24 are connected by an Ethernet cable EB4, and the third zone ECU 23 and the fourth zone ECU 24 are connected by an Ethernet cable EB5. Here, the Ethernet signal is a signal conforming to the Ethernet protocol. Similarly, the CAN signal to be described later is a signal conforming to the CAN protocol, the CAN-FD signal is a signal conforming to the CAN-FD protocol, and the local interconnect network (LIN) signal is a signal conforming to the LIN protocol.

In FIG. 1, the fifth zone ECU 25, the sixth zone ECU 26, and the seventh zone ECU 27 function as a CAN hub device (denoted as "C-EC" in FIG. 1) that transmits and receives a CAN with Flexible Data-Rate (CAN-FD) signal or a CAN (Controller Area Network) signal to and from the central processing unit 10 and/or another zone ECU 2. The first zone ECU 21 and the fifth zone ECU 25 are connected by a CAN-FD cable CB5, the second zone ECU 22 and the sixth zone ECU 26 are connected by a CAN-FD cable CB6, and the fifth zone ECU 25 and the sixth zone ECU 26 are connected by a CAN-FD cable CB8. The first zone ECU 21 and the seventh zone ECU 27 are connected by a CAN-FD cable CB7.

In the present embodiment, the network formed by signal transmission paths between the central processing unit 10 and the zone ECUs 2 and signal transmission paths between the zone ECUs 2 is referred to as "trunk network". In FIG. 1, the trunk network includes the Ethernet cables EB1 to EB5 and the CAN-FD cables CB5 to CB8. Referring to FIG. 1, in the trunk network, the transmission path of the Ethernet signal (a signal conforming to the Ethernet standard) is indicated by a thick solid line, and the transmission path of the CAN-FD signal or the CAN signal is indicated by a middle thick solid line. Furthermore, the signal transmission path from each of the zone ECUs 21 to 27 to the in-vehicle device side is referred to as "device-side network". In FIG. 1, the signal path from each of the zone ECUs 21 to 27 to each in-vehicle device, that is, the device-side network is indicated by a thin solid line. The signal paths indicated by thin solid lines include analog/digital signal paths, CAN signal paths, LIN signal paths, and CAN-FD signal paths.

In order to enable autonomous driving and assisted driving of the vehicle 1, the central processing unit 10 calculates a route on which the vehicle 1 should travel in response to outputs from sensors mounted on the vehicle 1, and determines the motion of the vehicle 1 for following the route. The central processing unit 10 is, for example, a processor including one or a plurality of chips, and has an artificial intelligence (AI) function in some cases. In the configuration example of FIG. 1, the central processing unit 10 includes a processor and a memory. The memory stores a module that is software executable by the processor. The function of each unit of the central processing unit 10 is implemented, for example, by the processor executing each module stored in the memory. In addition, the memory also stores data of a model used by the central processing unit 10. Note that the processor and the memory can be provided in plural. Furthermore, some of the functions of the respective units in the central processing unit 10 illustrated in FIG. 1 can be implemented by a hardware circuit. The same holds true for the ECU to be described later. Note that the zone ECU can include a processor and a memory, or does not need to include a processor or a memory.

The sensors that output information to the central processing unit 10 include, for example, a camera that captures an environment outside the vehicle, a radar that detects a target or the like outside the vehicle, a global positioning system (GPS) sensor that detects a position of the vehicle, a vehicle state sensor that detects a behavior of the vehicle such as a vehicle speed, an acceleration, and a yaw rate, and an occupant state sensor that acquires a state of an occupant of the vehicle such as an in-vehicle camera. Furthermore, communication information from other vehicles located around an own vehicle and/or traffic information from a navigation system can be input to the central processing unit 10.

Figure 2:
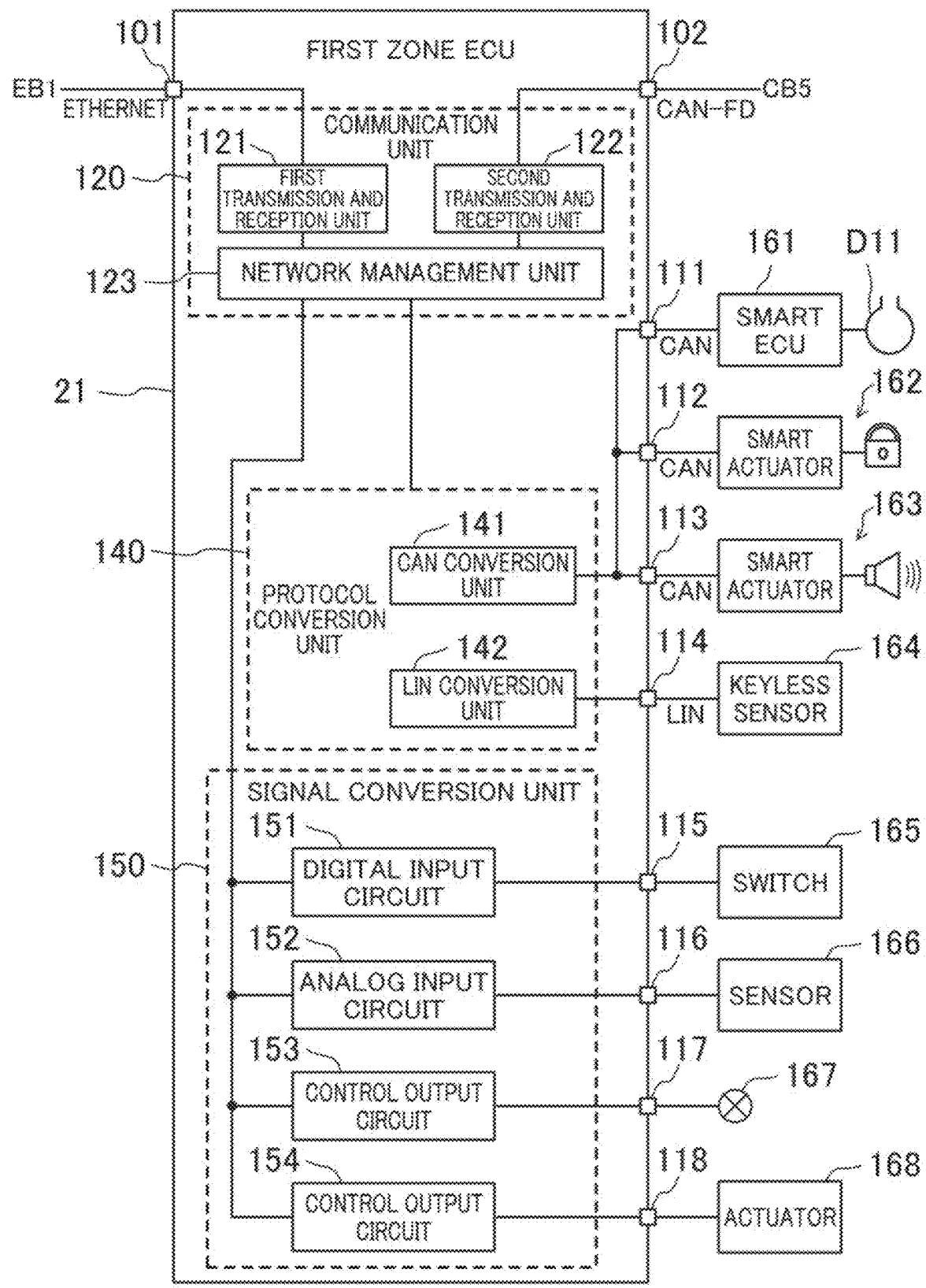
FIG. 2 is a diagram illustrating a functional configuration example of a first zone ECU.

FIG. 2 is a diagram illustrating a functional configuration example of the first zone ECU 21.

The first zone ECU 21 includes a communication unit 120, a protocol conversion unit 140, and a signal conversion unit 150. The protocol conversion unit 140 includes a CAN conversion unit 141 and a LIN conversion unit 142. The signal conversion unit 150 includes a digital input circuit 151, an analog input circuit 152, and control output circuits 153 and 154.

The first zone ECU 21 includes, as communication ports (hereinafter, referred to as "trunk ports") connected to the trunk network, a trunk port 101 to which the Ethernet cable EB1 is connected and a trunk port 102 to which the CAN-FD cable CB5 is connected. In other words, the trunk port 101 and the trunk port 102 are ports to which a trunk network signal that is a signal transmitted on the trunk network is input and output.

The first zone ECU 21 includes communication ports 111 to 118 as communication ports connected to the device-side network. The first zone ECU 21 inputs and outputs CAN signals via the communication ports 111 to 113, inputs and outputs LIN signals via the communication port 114, inputs digital control signals via the communication port 115, inputs analog control signals via the communication port 116, and outputs analog control signals via the communication ports 117 and 118. For example, the communication port 111 is connected to a smart ECU 161, and the smart ECU 161 is connected to an airbag device D11. For example, the communication port 112 is connected to a smart actuator 162 for locking and unlocking a side door. For example, the communication port 113 is connected to a smart actuator 163 for emitting a buzzer sound or the like. For example, the communication port 114 is connected to a sensor 164 (hereinafter, referred to as "keyless sensor 164") for operating a keyless device. For example, the communication port 115 is connected to a switch 165 (for example, a clutch cut switch, a brake switch, or the like). For example, the communication port 116 is connected to a sensor 166 (for example, an accelerator pedal sensor, a clutch stroke sensor, or the like). For example, the communication port 117 is connected to a turn lamp 167 of a door mirror. For example, the communication port 118 is connected to an actuator 168 (for example, an indicator lamp or the like attached to a horn, a keyless buzzer, a meter device, or the like). Note that, in the drawings, the symbol mark of a lock mechanism is illustrated in addition to the smart actuator 162 for easy understanding of the description. Furthermore, in addition to the smart actuator 163, the symbol mark of a sound source mechanism is illustrated.

Although not specifically illustrated, the in-vehicle device can be attached or detached by inserting a connector at the distal end of a cable extending from the in-vehicle device into each of the communication ports 111 to 118. In addition, each of the communication ports 111 to 118 can be connected to a smart connector (not illustrated), and the in-vehicle device can be attached to the smart connector. The smart connector includes, for example, an analog/digital conversion circuit, a driver circuit, and the like, and has a function of transmitting a drive signal to an actuator serving as the in-vehicle device, and/or a function of transmitting an input signal from a sensor serving as the in-vehicle device to the zone ECU 2.

The communication unit 120 includes a first transmission and reception unit 121 connected to the trunk port 101, a second transmission and reception unit 122 connected to the trunk port 102, and a network management unit 123.

The first transmission and reception unit 121 has a function of transmitting and receiving a trunk network signal (an Ethernet signal) to and from the central processing unit 10 via the trunk port 101 and the Ethernet cable EB1. Although not specifically illustrated, the first transmission and reception unit 121 includes, for example, a coding circuit that generates an Ethernet signal, a driver circuit that outputs the Ethernet signal generated by the coding circuit to the central processing unit 10, a receiver circuit that receives the Ethernet signal output from the central processing unit 10, and a decoding circuit that decodes the Ethernet signal received by the receiver circuit.

The second transmission and reception unit 122 has a function of transmitting and receiving a trunk network signal (a CAN-FD signal) to and from the fifth zone ECU 25 via the trunk port 102 and the CAN-FD cable CB5. Although not specifically illustrated, the second transmission and reception unit 122 includes, for example, a coding circuit that generates a CAN-FD signal, a driver circuit that outputs the CAN-FD signal generated by the coding circuit to the fifth zone ECU 25, a receiver circuit that receives the CAN-FD signal output from the fifth zone ECU 25, and a decoding circuit that decodes the CAN-FD signal received by the receiver circuit.

The network management unit 123 has (a) a relay function of relaying a trunk network signal on a trunk network, that is, between the trunk ports 101 and 102, (b) a distribution function of extracting a signal for a device connected to the own ECU from trunk network signals and distributing the signal, and (c) an integration function of integrating data to be transmitted from the device connected to the own ECU to the central processing unit 10 and/or another zone ECU 2. Note that, in the following description (including description of other zone ECUs 2), the functions mentioned above may be simply referred to as "(a) relay function", "(b) distribution function", and "(c) integration function".

The protocol conversion unit 140 performs protocol conversion so that data can be exchanged between communication schemes. Specifically, the protocol conversion unit 140 is connected to the network management unit 123, and performs protocol conversion according to each of "(a) relay function", "(b) distribution function", and "(c) integration function" of the network management unit 123 described above. Note that, in the present embodiment, the protocol conversion includes a conversion process such as data length conversion between CAN and CAN-FD.

In "(a) relay function", the network management unit 123 extracts data (hereinafter, referred to as "relay data") to be transmitted to the fifth zone ECU 25 from the Ethernet signal input from the central processing unit 10, and outputs the extracted data to the protocol conversion unit 140. The protocol conversion unit 140 converts relay data to CAN protocol data and outputs the CAN protocol data to the network management unit 123. The network management unit 123 generates a CAN signal on the basis of the CAN protocol data. The second transmission and reception unit 122 then outputs the CAN signal to the fifth zone ECU 25 via the trunk port 102. Similarly, the network management unit 123 extracts data (hereinafter, referred to as "relay data") to be transmitted to the central processing unit 10 from the CAN-FD signal input from the fifth zone ECU 25, and outputs the extracted data to the protocol conversion unit 140. The protocol conversion unit 140 converts the relay data to data in a format conforming to the Ethernet protocol and outputs the data to the network management unit 123. The network management unit 123 generates an Ethernet signal on the basis of the converted data. The first transmission and reception unit 121 then outputs the Ethernet signal to the central processing unit 10 via the trunk port 101.

To summarize the above from the viewpoint of a delay time, at least a reception delay time, a protocol conversion time, and a transmission delay time are generated in the process related to "(a) relay function" (hereinafter, referred to as "relay process"). The reception delay time is a reception delay time due to a reception process in the communication unit 120. The reception delay time includes, for example, a reception processing time of a physical layer or the like in the first transmission and reception unit 121 or the second transmission and reception unit 122 and a subsequent decoding processing time, and an extraction processing time for extracting relay data in the network management unit 123. The protocol conversion time includes a time for protocol conversion between communication schemes in the protocol conversion unit 140. The transmission delay time is a delay time due to a transmission process of transmitting protocol-converted data from the communication unit 120. The transmission delay time includes, for example, a coding processing time in the first transmission and reception unit 121 or the second transmission and reception unit 122 and a transmission processing time of a physical layer or the like.

In addition, the activation delay time related to an activation operation and/or a return operation may be generated in the first zone ECU 21. For example, in "(a) relay function", it is assumed that an activation signal is transmitted from the Ethernet cable EB1 or the CAN-FD cable CB5. In a case where the phase locked loop (PLL) circuit of the communication unit 120 is in a stopped state when the activation signal is received, for example, the activation and stabilization time of the physical layer and the communication establishment time required for establishing communication with the adjacent central processing unit 10 and/or zone ECU 2 are generated as the activation delay time. Examples of the state where the PLL circuit of the communication unit 120 is stopped include a power-off state or a sleep state of the first zone ECU 21.

In "(b) distribution function", the network management unit 123 extracts data (hereinafter, referred to as "own ECU data") for a device connected to the own ECU from the Ethernet signal input from the central processing unit 10. The network management unit 123 determines whether the data for the own ECU is data for a device connected to the protocol conversion unit 140 or data for a device connected to the signal conversion unit 150, and distributes the data to each of the units. In the protocol conversion unit 140, when data for devices connected to the communication ports 111 to 113 is received from the network management unit 123, the CAN conversion unit 141 converts the received data to a signal conforming to the CAN protocol and outputs the signal to the communication ports 111 to 113. As a result, a signal (for example, a control signal) from the central processing unit is transmitted to each of the smart ECU 161 and the smart actuators 162 and 163. In the signal conversion unit 150, when data for controlling the turn lamp 167 connected to the communication port 117 is received from the network management unit 123, the control output circuit 153 generates, for example, an analog control signal of the turn lamp 167 according to a control value received from the central processing unit 10, and outputs the analog control signal to the communication port 117. Similarly, in the signal conversion unit 150, when data for controlling the actuator 168 connected to the communication port 118 is received from the network management unit 123, the control output circuit 154 generates, for example, an analog control signal of the actuator 168 according to a control value received from the central processing unit 10, and outputs the analog control signal to the communication port 118. Note that, the process similar to that in the case of the central processing unit 10 described above is also performed in a case where data for a device connected to the own ECU is included in the CAN signal input from the fifth zone ECU 25.

To summarize the above from the viewpoint of the delay time, at least the reception delay time, the protocol conversion time, and a processing delay time are generated in the process related to "(b) distribution function" (hereinafter, referred to as "distribution process") in the case of passing through the protocol conversion unit 140. Furthermore, in the case of passing through the signal conversion unit 150, at least the reception delay time due to the reception process in the communication unit 120 and the processing delay time in the signal conversion unit 150 are generated in the distribution process. The reception delay time is a delay time due to the reception process in the communication unit 120 and includes, for example, the reception processing time, the decoding processing time, and the extraction processing time for extracting data for the own ECU in the network management unit 123, as in the case of the relay process. The protocol conversion time includes a time for protocol conversion between communication schemes in the protocol conversion unit 140. The processing delay time includes a processing delay time in the smart ECU 161 or the smart actuators 162 and 163.

Furthermore, in "(b) distribution function" of the first zone ECU 21, in a case where the in-vehicle device connected to the first zone ECU 21 is in a power-off state or a sleep state, an activation delay time for returning the in-vehicle device is generated in addition to or instead of the activation delay time described in "(a) relay function".

In "(c) integration function", for example, the protocol conversion unit 140 receives an unlock or lock signal (a LIN signal) from the keyless sensor 164, converts data conforming to the LIN protocol to data conforming to the Ethernet protocol, and transmits the converted data to the network management unit 123. Furthermore, for example, in the signal conversion unit 150, the digital input circuit 151 receives an input signal from the switch 165, the analog input circuit 152 receives an input signal from the sensor 166, and the circuits 151 and 152 transmit the received data to the network management unit 123. The network management unit 123 integrates the received data from the protocol conversion unit 140 and the received data from the signal conversion unit 150. The first transmission and reception unit 121 outputs the data integrated by the network management unit 123, as an Ethernet signal, to the central processing unit 10 via the trunk port 101. Note that, the process similar to that in the case of outputting the data to the central processing unit 10 is also performed in the case of transmitting the data integrated by the integration function to the fifth zone ECU 25.

Furthermore, for example, in a case where the first zone ECU 21 is in the power-off state or the sleep state when the protocol conversion unit 140 receives an output signal (a LIN signal) from the keyless sensor 164, the return operation of the communication unit 120 is performed in the first zone ECU 21. In addition, the communication unit 120 transmits, to the central processing unit 10 and/or the fifth zone ECU 25, the reception of the unlock (lock) signal from the keyless sensor 164 after the return operation is completed. The transmission signal has a function as a return signal for causing the central processing unit 10 and/or the fifth zone ECU 25 to perform the return operation.

To summarize the above from the viewpoint of the delay time, at least the protocol conversion time, an integration processing time, and the transmission delay time are generated in the process related to "(c) integration function" (hereinafter, referred to as "integration process") in the case of passing through the protocol conversion unit 140. In addition, at least the integration processing time and the transmission delay time are generated in the integration process in the case of passing through the signal conversion unit 150. The protocol conversion time includes the time for protocol conversion between communication schemes in the protocol conversion unit 140. The integration processing time includes a time for the network management unit 123 to integrate the data received from the signal conversion unit 150 and/or the protocol conversion unit 140 for each transmission destination. The transmission delay time is a delay time due to a transmission process of transmitting the data integrated by the network management unit 123 from the communication unit 120. The transmission delay time includes, for example, the coding processing time in the first transmission and reception unit 121 or the second transmission and reception unit 122 and the transmission processing time of the physical layer or the like.

Furthermore, in "(c) integration function" of the first zone ECU 21, in a case where a return signal (for example, an unlock signal for the keyless sensor 164) is received from a predetermined in-vehicle device connected to the first zone ECU 21, the activation delay time for transmitting the return signal to the central processing unit 10 or the fifth zone ECU 25 is generated. In a case where the PLL circuit of the communication unit 120 is stopped, for example, the activation and stabilization time of the physical layer and the communication establishment time required for establishing communication with the adjacent central processing unit 10 and/or zone ECU 2 are generated as the activation delay time. In addition, the activation delay time may include a return processing time in the network management unit 123.

Figure 3:
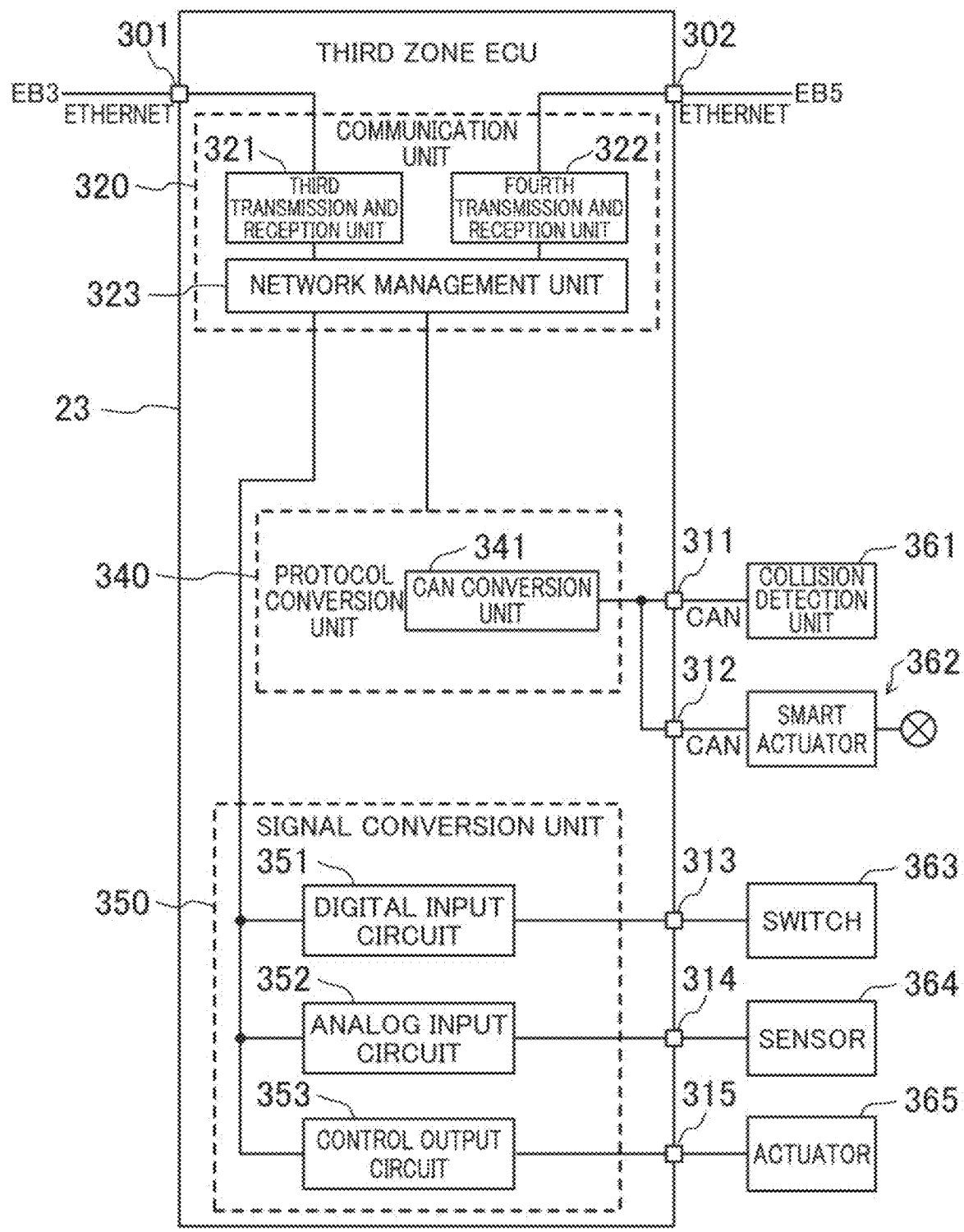
FIG. 3 is a diagram illustrating a functional configuration example of a third zone ECU.

FIG. 3 illustrates a functional configuration example of the third zone ECU 23. Here, the description of the same configuration as that of the first zone ECU 21 may be omitted.

The third zone ECU 23 includes a communication unit 320, a protocol conversion unit 340, and a signal conversion unit 350. The protocol conversion unit 340 includes a CAN conversion unit 341. The signal conversion unit 350 includes a digital input circuit 351, an analog input circuit 352, and a control output circuit 353.

The third zone ECU 23 includes a trunk port 301 to which the Ethernet cable EB3 is connected and a trunk port 302 to which the Ethernet cable EB5 is connected. In other words, the trunk port 301 and the trunk port 302 are ports to which a trunk network signal is input and output.

The third zone ECU 23 includes communication ports 311 to 315 as device ports. The third zone ECU 23 inputs and outputs CAN signals via the communication ports 311 and 312, inputs digital control signals via the communication port 313, inputs analog control signals via the communication port 314, and outputs analog control signals via the communication port 315. For example, the communication port 311 is connected to a collision detection unit 361 that detects a collision of the vehicle 1. For example, the communication port 312 is connected to a smart actuator 362 for operating a turn lamp on the vehicle front side. For example, the communication port 313 is connected to a switch 363

(for example, a washer level switch, a hood switch, or the like). For example, the communication port 314 is connected to a sensor 364 (for example, an outside air temperature sensor, an air flow sensor, or the like). For example, the communication port 315 is connected to an actuator 365 (for example, a horn, a keyless buzzer, or the like). Note that, in the drawings, the symbol mark of the turn lamp is illustrated in addition to the smart actuator 362 for easy understanding of the description.

The communication unit 320 includes a third transmission and reception unit 321 connected to the trunk port 301, a fourth transmission and reception unit 322 connected to the trunk port 302, and a network management unit 323. Note that, in the communication unit 320, the configuration and function related to the invention of the present application are similar to those of the communication unit 120 of the first zone ECU 21 described above, and thus the detailed description thereof will be omitted here. Specifically, when the communication unit 120 of the first zone ECU 21 is compared with the communication unit 320 of the third zone ECU 23, the second transmission and reception unit 122 of the first zone ECU 21 conforms to the CAN-FD protocol, whereas the fourth transmission and reception unit 322 of the third zone ECU 23 conforms to the Ethernet protocol. However, the configuration of the transmission and reception circuit and the delay information conforming to each communication scheme can be replaced on the basis of the conventional technique.

The protocol conversion unit 340 performs protocol conversion so that data can be exchanged between communication schemes. Here, the difference between the protocol conversion unit 340 and the protocol conversion unit 140 of the first zone ECU 21 will be mainly described, and the description of the same contents may be omitted.

The third zone ECU 23 relays between an Ethernet signal and an Ethernet signal in "(a) relay function". Consequently, unlike the protocol conversion unit 140 described above, the protocol conversion unit 340 does not require protocol conversion in the relay process. That is, in the relay process of the third zone ECU 23, at least the reception delay time and the transmission delay time are generated. In addition, the activation delay time related to the activation operation and/or the return operation may be generated in the third zone ECU 23. Note that the reception delay time, the transmission delay time, and the activation delay time are similar to those of the first zone ECU 21 described above, and thus the detailed description thereof will be omitted here.

"(b) Distribution function" and the delay time due to the distribution process in the third zone ECU 23 have the same contents as those in the first zone ECU 21 described above, and thus the detailed description thereof will be omitted here. To summarize the above from the viewpoint of the delay time, at least the reception delay time, the protocol conversion time, and the processing delay time are generated in the distribution process of the third ECU 23 (1) in the case of passing through the protocol conversion unit 340. Furthermore, (2) in the case of passing through the signal conversion unit 350, at least the reception delay time due to the reception process in the communication unit 320 and the processing delay time in the signal conversion unit 350 are generated. In addition, in a case where the in-vehicle device connected to the third zone ECU 23 is in the power-off state or the sleep state, the activation delay time for returning the in-vehicle device may be generated in the activation operation and the return operation described above. Note that the reception delay time, the protocol conversion time, the processing delay time, and the activation delay time are similar to those of the first zone ECU 21 described above, and thus the detailed description thereof will be omitted here.

"(c) Integration function" and the delay time due to the integration process in the third zone ECU 23 have the same contents as those in the first zone ECU 21 described above, and thus the detailed description thereof will be omitted here. To summarize the above from the viewpoint of the delay time, at least the protocol conversion time, the integration processing time, and the transmission delay time are generated in the integration process of the third ECU 23 (1) in the case of passing through the protocol conversion unit 340. In addition, at least the integration processing time and the transmission delay time are generated (2) in the case of passing through the signal conversion unit 350. Furthermore, in a case where a return signal is received from a predetermined in-vehicle device connected to the third zone ECU 23, the activation delay time for transmitting the return signal to the central processing unit 10 and/or the fourth zone ECU 24 may be generated. Note that the protocol conversion time, the integration processing time, the transmission delay time, and the activation delay time are similar to those of the first zone ECU 21 described above, and thus the detailed description thereof will be omitted here.

Figure 4:
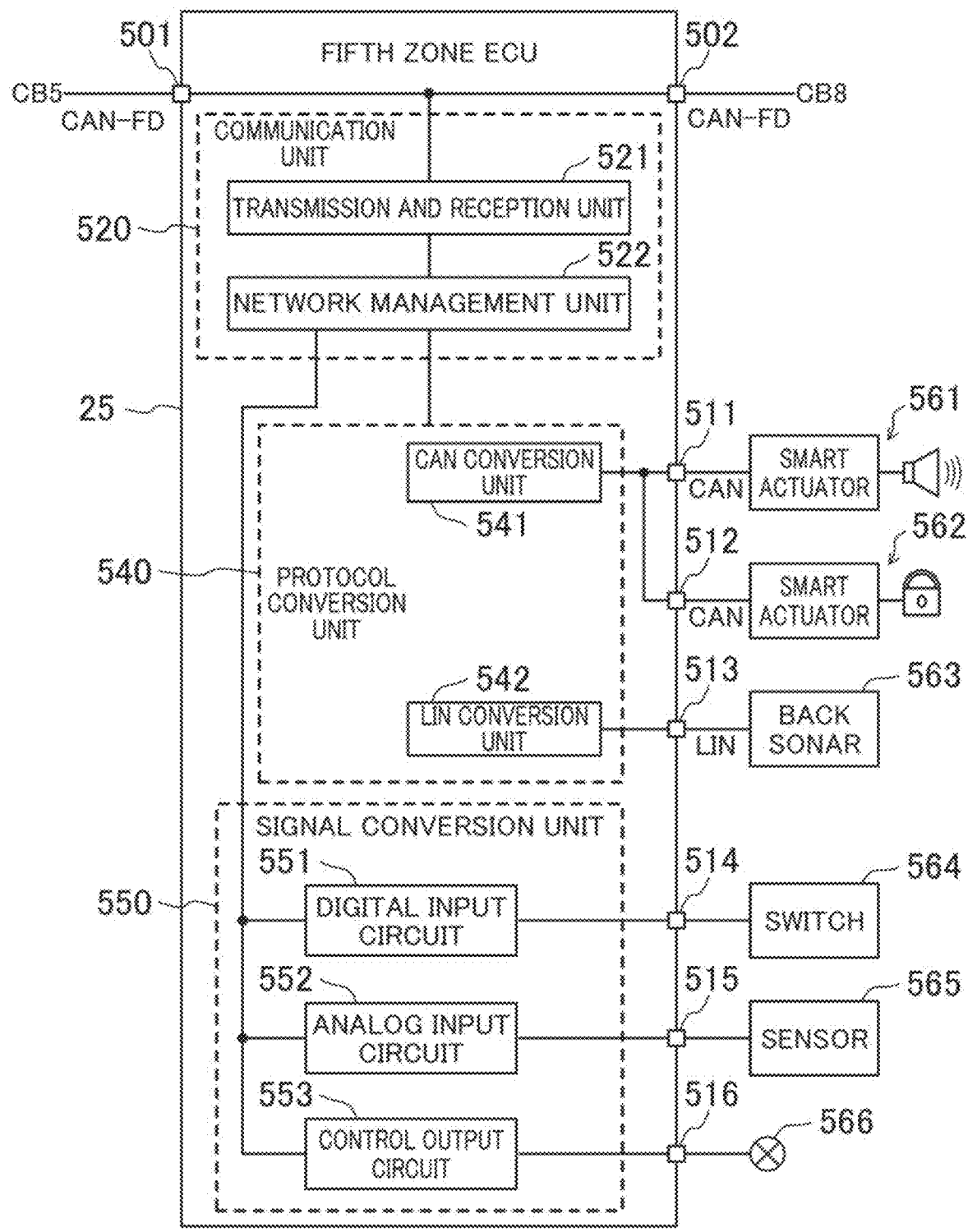
FIG. 4 is a diagram illustrating a functional configuration example of a fifth zone ECU.

FIG. 4 illustrates a functional configuration example of the fifth zone ECU 25. Here, the description of the same configuration as that of the first zone ECU 21 and/or the third zone ECU 23 may be omitted.

The fifth zone ECU 25 includes a communication unit 520, a protocol conversion unit 540, and a signal conversion unit 550. The protocol conversion unit 540 includes a CAN conversion unit 541 and a LIN conversion unit 542. The signal conversion unit 550 includes a digital input circuit 551, an analog input circuit 552, and a control output circuit 553.

The fifth zone ECU 25 includes a trunk port 501 to which the CAN-FD cable CB5 is connected and a trunk port 502 to which the CAN-FD cable CB8 is connected. In other words, in the fifth zone ECU 25, a CAN-FD signal is input and output to and from the trunk port 501 and the trunk port 502, and the trunk port 501 and the trunk port 502 are directly connected.

The fifth zone ECU 25 includes communication ports 511 to 516 as device ports. The fifth zone ECU 25 inputs and outputs CAN signals via the communication ports 511 and 512, inputs and outputs LIN signals via the communication port 513, inputs digital control signals via the communication port 514, inputs analog control signals via the communication port 515, and outputs analog control signals via the communication port 516. For example, the communication port 511 is connected to a smart actuator 561 for emitting a buzzer sound or the like. For example, the communication port 512 is connected to a smart actuator 562 for locking a side door. For example, the communication port 513 is connected to a back sonar device 563. For example, the communication port 514 is connected to a switch 564. For example, the communication port 515 is connected to a sensor 565 (for example, a fuel sensor, a kick sensor, or the like). For example, the communication port 516 is connected to a turn light 566 on the rear left of the vehicle. Note that, in the drawings, the symbol mark of the sound source mechanism is illustrated in addition to the smart actuator 561 for easy understanding of the description. Furthermore, in addition to the smart actuator 562, the symbol mark of the lock mechanism is illustrated.

The communication unit 520 includes a transmission and reception unit 521 connected to a common communication line connecting the trunk port 501 and the trunk port 502 and a network management unit 522. Although not specifically illustrated, the transmission and reception unit 521 includes, for example, a coding circuit that generates a CAN-FD signal, a driver circuit and a receiver circuit connected to the common communication line, and a decoding circuit that decodes the CAN-FD signal received by the receiver circuit.

The protocol conversion unit 540 performs protocol conversion so that data can be exchanged between communication schemes. Here, the difference between the protocol conversion unit 540 and the protocol conversion unit 140 of the first zone ECU 21 will be mainly described, and the description of the same contents may be omitted.

In the fifth zone ECU 25, since the trunk port 501 and the trunk port 502 are directly connected, there is no concept of "(a) relay function". That is, in the fifth zone ECU 25, the relay process of relaying between two adjacent zone ECUs 2 is not performed, and the delay time between the trunk port 501 and the trunk port 502 is only the signal propagation time of the common communication line and is extremely small. Similarly, the activation delay time is not generated in "(a) relay function" of the fifth zone ECU 25.

"(b) Distribution function" and the delay time due to the distribution process in the fifth zone ECU 25 have the same contents as those in the first zone ECU 21 described above, and thus the detailed description thereof will be omitted here. To summarize the above from the viewpoint of the delay time, at least the reception delay time, the protocol conversion time, and the processing delay time are generated in the distribution process of the fifth ECU 25 (1) in the case of passing through the protocol conversion unit 540. Furthermore, (2) in the case of passing through the signal conversion unit 550, at least the reception delay time due to the reception process in the communication unit 520 and the processing delay time in the signal conversion unit 550 are generated. In addition, in a case where the in-vehicle device connected to the fifth zone ECU 25 is in the power-off state or the sleep state, the activation delay time for returning the in-vehicle device may be generated in the activation operation and the return operation described above. Note that the reception delay time, the protocol conversion time, the processing delay time, and the activation delay time are similar to those of the first zone ECU 21 described above, and thus the detailed description thereof will be omitted here.

"(c) Integration function" and the delay time due to the integration process in the fifth zone ECU 25 have the same contents as those in the first zone ECU 21 described above, and thus the detailed description thereof will be omitted here. To summarize the above from the viewpoint of the delay time, at least the protocol conversion time, the integration processing time, and the transmission delay time are generated in the integration process of the fifth ECU 25 (1) in the case of passing through the protocol conversion unit 540. In addition, at least the integration processing time and the transmission delay time are generated (2) in the case of passing through the signal conversion unit 550. Furthermore, in a case where a return signal is received from a predetermined in-vehicle device connected to the fifth zone ECU 25, the activation delay time for transmitting the return signal to the first zone ECU 21 and/or the sixth zone ECU 26 may be generated. Note that the protocol conversion time, the integration processing time, the transmission delay time, and the activation delay time are similar to those of the first zone ECU 21 described above, and thus the detailed description thereof will be omitted here.

<Design Method for Vehicle Control System>
—Outline—

As described in "Technical Problem", in the future, the arithmetic processing function and the control function of each actuator will be integrated into a central processing unit that integrally manages the operation of the entire vehicle. This means that the arithmetic function and the control function currently mounted on an ECU provided for each zone of the vehicle and an ECU (hereinafter, collectively referred to as "conventional ECU") provided for each function as in Patent Literature 1 are incorporated in the central processing unit.

However, the criteria for determining a function that can be incorporated in the central processing unit and a function that is left on the ECU side without being incorporated in the central processing unit among the arithmetic function and control function mounted on the conventional ECU is not clear, and a conventional technique that clearly indicates the criteria has not been found.

Consequently, the inventors of the present application have extensively conducted studies, and have found a design method for separating the function that can be incorporated in the central processing unit and the function that is left on the ECU side from the arithmetic function and control function mounted on the conventional ECU.

The outline of the design method according to the present disclosure will be briefly described. In a case where the control function that operates without any problem by a control method using the conventional ECU is incorporated in the central processing unit, there is a problem of communication delay as one of elements largely different from the conventional ECU. As described above, it is not realistic to directly connect each sensor and each actuator to the central processing unit in which functions are integrated, because the number of signal lines increases, and thus the in-vehicle network is assumed to be constructed. Then, a relay device such as a network hub device and/or a gateway device is interposed between the central processing unit and an in-vehicle device or an ECU that controls the in-vehicle device, resulting in a communication delay. As a result, this communication delay may become a problem in control that requires a response speed from the occurrence of a certain input and/or situation to the actual operation of the in-vehicle device. The communication delay time can be predicted in advance to some extent in a case where a specific arithmetic operation or control operation is not involved. Therefore, the present invention is characterized in that "allowable delay time" is set as the reference of a delay time allowed as a communication delay time, and the function that can be incorporated in the central processing unit and the function that is left on the ECU side are separated on the basis of the allowable delay time. The communication delay time includes a communication delay (hereinafter, referred to as "input-side communication delay") from an in-vehicle device to which an input that is the source of control such as a signal is made to the central processing unit, and a communication delay (hereinafter, referred to as "output-side communication delay") from the central processing unit to a control circuit on the side of an in-vehicle device operated in response to the input.

That is, the invention of the present application is characterized in that the function that can be incorporated in the central processing unit and the function that is left on the ECU side are determined on the basis of the relationship between the input-side communication delay time, the output-side communication delay time, and the allowable delay time. Here, "allowable delay time" is a time that can be freely set, and is not particularly limited. For example, the allowable delay time can be set on the basis of standards such as vehicle safety standards, or can be set on the basis of a behavior of the vehicle, relevance to other functions, or the like. Alternatively, the allowable delay time can be set from the viewpoint of not giving discomfort or stress to the driver or the like.

Here, in the present embodiment, as illustrated in FIG. 1, the vehicle 1 is divided into a plurality of (seven in the present embodiment) zones, the zone ECU 2 is provided in each zone, and these zones are connected to construct a trunk network. Each zone ECU 2 includes a communication port, and the communication port is connected to an in-vehicle device. With such a configuration, it is easy to recognize the communication delay time between the central processing unit 10 and each communication port in advance. That is, the communication delay time with the central processing unit 10 can be estimated for each communication port before the in-vehicle device is connected to each communication port of the zone ECU. As a result, it is possible to relatively easily separate the function that can be incorporated in the central processing unit 10 and the function that is left on the ECU side without performing complicated arithmetic processing.

—Design Flow of Vehicle Control System—

Hereinafter, a specific design flow of the design method for a vehicle control system according to the present embodiment will be described with reference to FIGS. 5 to 9. Note that, it can be configured that, for example, a design program for implementing the present design method is prepared, and the design program is executed using a computer.

Figure 5:
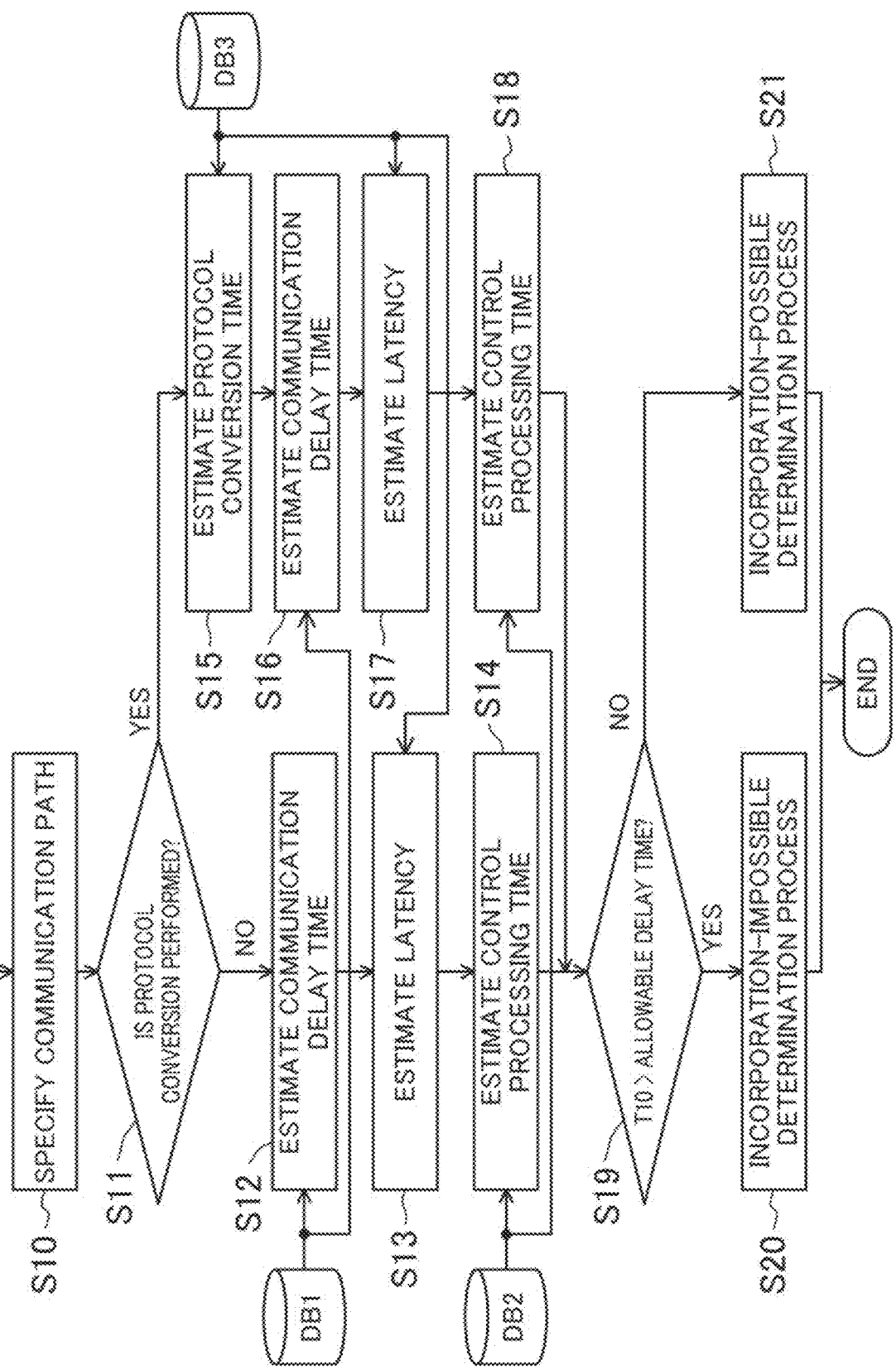
FIG. 5 is a flowchart illustrating a design method for a vehicle control system according to a first embodiment.
Figure 6:
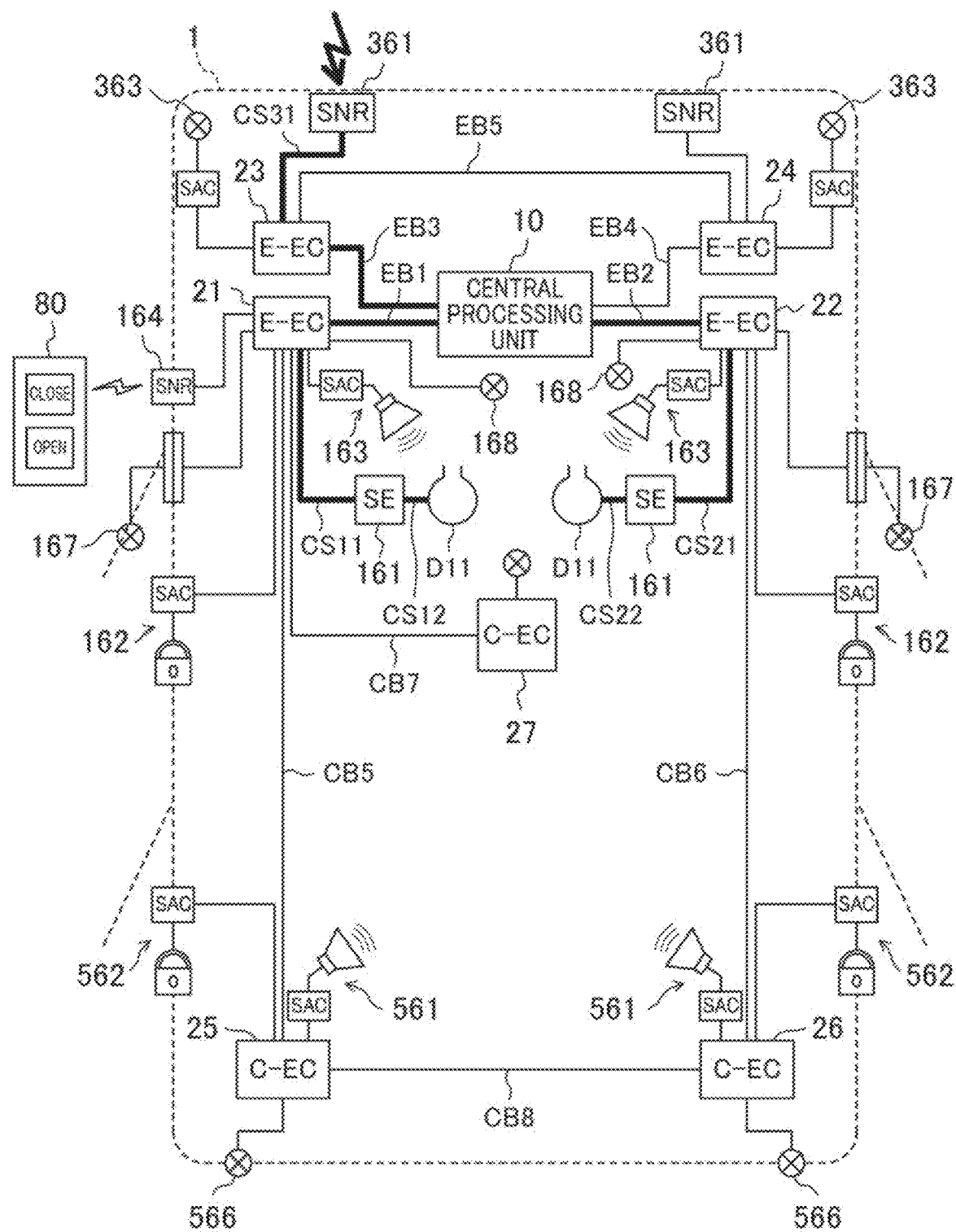
FIG. 6 is a diagram for explaining the design method for the vehicle control system according to the first embodiment.

Referring to FIG. 5, in step S10, a communication path between an in-vehicle device on an input side (hereinafter, referred to as "input device") such as a sensor or a switch and an in-vehicle device to be controlled (hereinafter, referred to as "operating device") is specified. For example, FIG. 6 illustrates a case where the input device is the collision detection unit 361 and the operating device is the airbag device D11. In the case of the example illustrated in FIG. 6, in step S10, a path from the collision detection unit 361 through the third zone ECU 23 via a LIN signal line CS31 to the central processing unit 10 via the Ethernet cable EB3 is specified as an input-side communication path. In addition, a path from the central processing unit 10 through the first zone ECU 21 via the Ethernet cable EB1 to the smart ECU 161 via a CAN signal line CS11 is specified as an output-side communication path.

In step S11, it is determined whether or not the communication protocol is converted in the specified communication path. In the example of FIG. 6, there is no conversion of the communication protocol in the input-side communication path, but since the conversion from the Ethernet protocol to the CAN protocol is performed in the output-side communication path, YES is determined, and the flow proceeds to the next step S15.

In steps S15 to S17, the communication delay time is estimated. Note that, in FIG. 5, the communication delay time in steps S15 to S17 and the control processing time in step S18 to be described later are described separately for the sake of convenience, but steps S15 to S18 can be performed in parallel or simultaneously.

Figure 7:
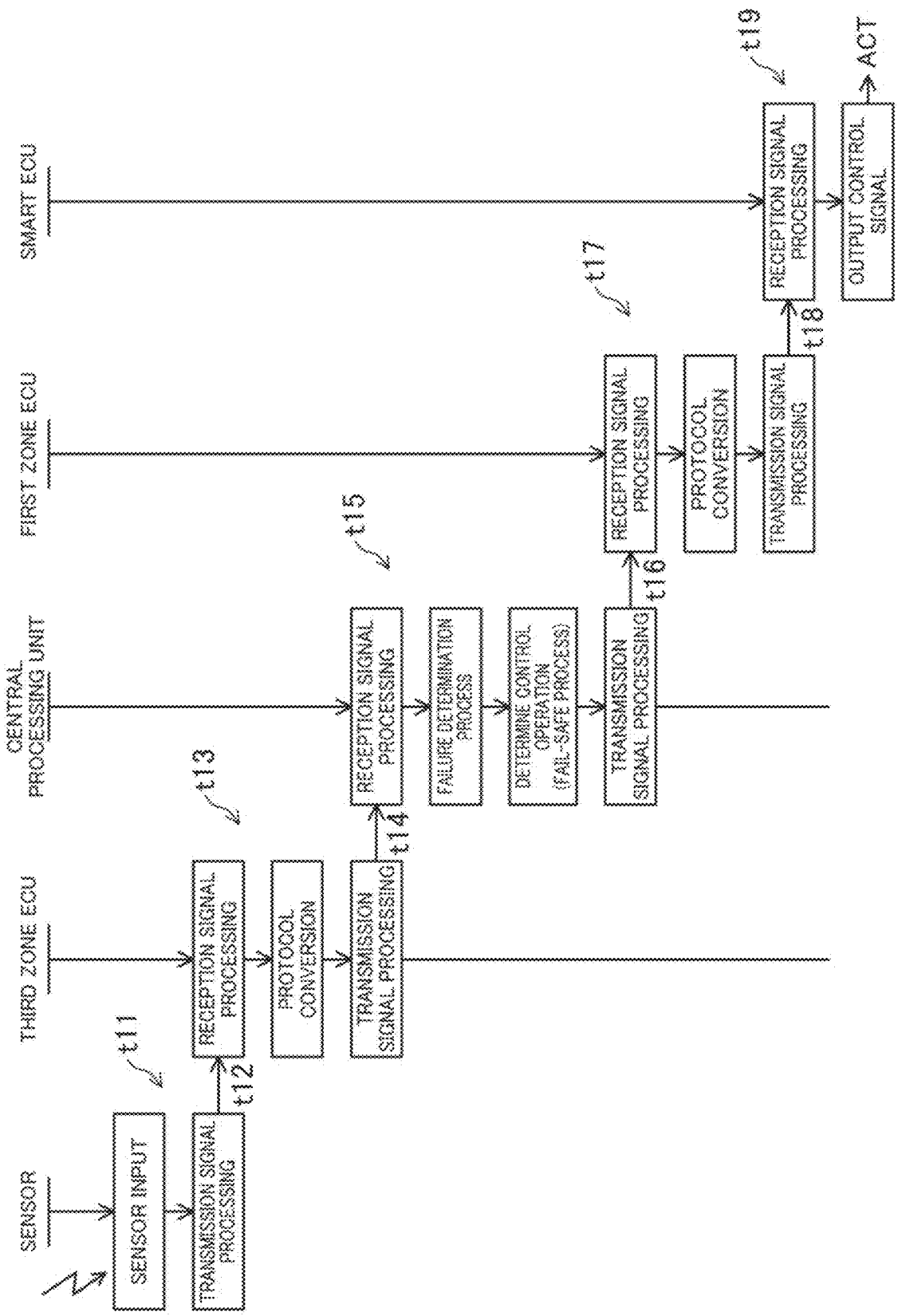
FIG. 7 is a diagram for explaining the design method for the vehicle control system according to the first embodiment.
Figure 8:
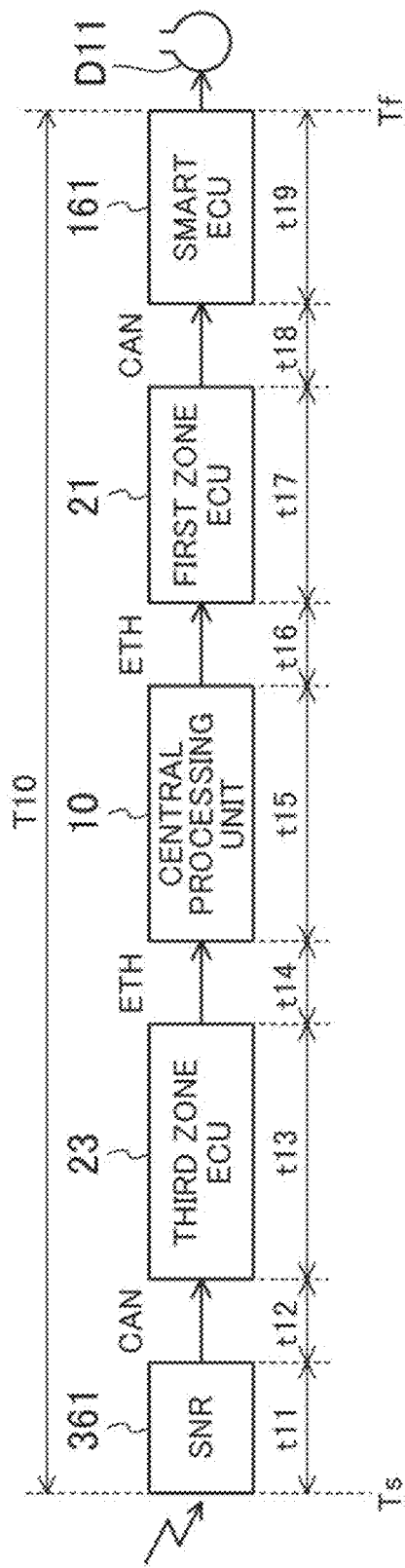
FIG. 8 is a diagram for explaining the design method for the vehicle control system according to the first embodiment.

FIGS. 7 and 8 are diagrams for explaining the communication delay time, and illustrate a temporal flow from when a collision is detected by the collision detection unit 361 to when a signal is output to the airbag device D11. The airbag device D11 is an example of an actuator to be operated, and the first zone ECU 21 is an example of a first zone ECU.

As illustrated in FIGS. 7 and 8, when collision information is input to the collision detection unit 361, the collision detection unit 361 performs transmission signal processing, and outputs a collision detection signal to the third zone ECU 23. The collision detection unit 361 is an example of an information acquisition unit, and the collision detection signal output from the collision detection unit 361 is an example of operation information.

The transmission delay time due to the transmission signal processing is generated as a communication delay time t11 in the collision detection unit 361. The transmission delay time includes, for example, a coding processing time and a transmission processing time of a physical layer or the like. t12 is a communication delay time in the communication path (the LIN signal line CS31) between the collision detection unit 361 and the third zone ECU 23.

Since "relay process" described above is performed in the third zone ECU 23, a reception delay time due to a reception process and a transmission delay time due to a transmission process to the central processing unit 10 are generated as a communication delay time t13. t14 is a communication delay time in the communication path (the Ethernet cable EB3) between the third zone ECU 23 and the central processing unit 10.

In the central processing unit 10, a reception processing time related to reception of an Ethernet signal from the third zone ECU 23 and a reception processing time related to transmission of the Ethernet signal to the first zone ECU 21 and the second zone ECU 22 are generated as a communication delay time t15. The transmission delay time includes, for example, a coding processing time and a transmission processing time of a physical layer or the like. The reception delay time includes, for example, a reception processing time of a physical layer or the like and a subsequent decoding processing time. Note that the central processing unit 10 performs a failure determination process and a control operation determination process (including a fail-safe process). Although these failure determination process and control operation determination process are not included in the communication delay time, for example, in a case where it takes more time for each process than the conventional ECU if these processes are incorporated in the central processing unit 10, the processing time can be included in the communication delay time in step S18. t16 is a communication delay time in the communication path (the Ethernet cable EB1) between the first zone ECU 21 and the central processing unit 10.

Since "relay process" described above is performed in the first zone ECU 21, the reception delay time due to the reception process, a protocol conversion time of the protocol conversion unit 140, and the transmission delay time due to the transmission process to the central processing unit 10 are generated as a communication delay time t17. t18 is a communication delay time in the communication path (the CAN signal line CS11) between the first zone ECU 21 and the smart ECU 161.

The reception delay time due to the signal transmission process of the first zone ECU 21 is generated as a communication delay time t19 in the smart ECU 161. The reception delay time includes, for example, a reception processing time of a physical layer or the like and a subsequent decoding processing time. Thereafter, a control signal of the airbag device D11 is generated and output in the smart ECU 161.

As described above, in the flow of steps S15 to S18, a communication delay time T10 from a time Ts when a collision is detected by the collision detection unit 361 to a time Tf when a control signal is output from the smart ECU 161 is calculated. As illustrated in FIG. 8, the communication delay time T10 in the example of FIG. 6 is the sum of the communication delay times t11 to t19.

In the next step S19, the communication delay time T10 is compared with the allowable delay time of the airbag device D11. The allowable delay time is a time allowed for the actuator to be operated from when the operation information is input to the information acquisition unit to when the control signal of the actuator is output, and is set in advance in each actuator, for example. For example, in the case of the airbag device, the allowable delay time corresponds to a time allowed from when a collision detection signal is output from the collision detection unit 361 to when a control signal is output to the airbag device D11. In other words, the communication delay time T10 is a minimum required delay time in a case where the input device is connected to one of the first zone ECU 21 and the third zone ECU 23 and the operating device is connected to the other. Consequently, in step S19, the communication delay time T10 is set as a predetermined reference time, and the communication delay time T10 is compared with the allowable delay time of the airbag device D11.

Then, when the allowable delay time of the airbag device D11 is less than the predetermined reference time (the communication delay time T10) (YES in step S19), the flow proceeds to step S20, and it is determined that an operation-signal generation unit of the airbag device D11 cannot be incorporated in the central processing unit 10. In step S20, for example, the operation-signal generation unit of the airbag device D11 is designed to be provided in the first zone ECU 21 or the smart ECU 161. Furthermore, in step S20, the connection of the operation-signal generation unit in the zone ECU 2 other than the first zone ECU 21 or the third zone ECU 23 can be considered. On the other hand, when the allowable delay time of the airbag device D11 is more than or equal to the predetermined reference time (the communication delay time T10) (NO in step S19), the flow proceeds to step S21, and it is determined that the operation-signal generation unit of the airbag device D11 can be incorporated in the central processing unit 10.

Returning to step S11, when NO is determined in step S11, that is, when no protocol conversion is performed in the specified communication path, the flow proceeds to step 312. In steps 312 and 313, the communication delay time is estimated. Note that the process in step S12 is similar to that in step S16 described above, and the process in step S13 is similar to the process in step S17 described above, and thus the detailed description thereof will be omitted here. In addition, as in step S18 described above, in a case where it takes more time for each process than the conventional ECU if the process is incorporated in the central processing unit, the time can be included in the communication delay time in step 314. When the processes in steps S12 to S14 end, the flow proceeds to step S19. Then, in step S19, for example, when the allowable time of the airbag device D11 is less than the predetermined reference time (the communication delay time T10) (YES in step S19), the flow proceeds to step S20, and the operation-signal generation unit of the airbag device D11 cannot be incorporated in the central processing unit 10, and it is designed that the operation-signal generation unit (including the control output circuit) of the airbag device D11 is provided (left) in the zone ECUs 21 and 22, or the smart ECU 161.

As described above, according to the present embodiment, the allowable time that is allowed from when the operation information is input to the information acquisition unit to when the control signal of the actuator is output is set in the actuator to be operated. The above embodiment has described an example of setting the allowable delay time allowed from when a collision is detected by the collision detection unit 361 to when the control signal of the airbag device D11 is output is set in the airbag device D11 corresponding to the actuator to be operated. According to the present embodiment, in a case where the allowable delay time is less than a predetermined reference time, the operation-signal generation unit of the actuator is designed to be provided in the zone ECU 2. For example, in a case where the response speed after collision detection is required as in the airbag device D11, the allowable delay time is set to be relatively short. As a result, when the allowable delay time is less than the predetermined reference time, the operation-signal generation unit of the airbag device D11 is designed to be provided in the zone ECU 2. In this case, the airbag device D11 corresponds to a second operation-signal generation unit. On the other hand, in an illumination device such as a vehicle interior lamp or a headlight, a sound device such as a buzzer, and the like, the allowable delay time that is allowed from when the operation of the driver, the environment outside the vehicle, or the like is recognized to when the control signal is output to the actuator to be operated can be set to be relatively long. As a result, when the allowable time is equal to or longer than the predetermined reference time, it is determined that the operation-signal generation unit can be incorporated in the central processing unit 10, that is, the operation-signal generation unit can be designed to be provided in the central processing unit 10. In this case, the illumination device and the sound device correspond to the first operation-signal generation unit. By providing the allowable delay time as described above, it is possible to roughly separate the function that can be incorporated in the side of the central processing unit 10 and the function provided on the side of the zone ECU 2 before complicated arithmetic processing or the like is performed.

Note that, in the present disclosure, the first zone ECU is a concept including a smart ECU connected to the zone ECU 2 in addition to the zone ECU 2 described in the above embodiment. That is, the first zone ECU in the present disclosure is a concept widely including an ECU provided in each zone of a vehicle. For example, in the example of the airbag device D11 described above, the smart ECU 161 is included in the first zone ECU in the present disclosure, and providing the operation-signal generation unit of the airbag device D11 in the smart ECU 161 corresponds to designing to provide the operation-signal generation unit on the side of the first zone ECU.

Furthermore, the vehicle 1 is divided into a plurality of (seven in the present embodiment) zones, the zone ECU 2 is provided in each zone, and these zone ECUs 2 are connected to construct a trunk network. Each zone ECU 2 includes a communication port, and the communication port is connected to an in-vehicle device using a connector or the like. As a result, the delay time between each zone ECU 2 and the central processing unit 10 can be obtained in advance by simulation or the like. It becomes easy to set "predetermined reference time" serving as a reference for providing the operation-signal generation unit on the side of the first zone ECU, and the setting accuracy is also enhanced. In a case where the trunk network is configured in advance, design data and/or simulation data such as communication delay information and/or a protocol conversion time in the trunk network can be registered in advance in a database (denoted as "DB1 to DB3" in FIG. 5), and the data of the databases DB1 to DB3 can be referred to in each design flow. As a result, design efficiency can be increased, and high-speed processing can be performed.

Note that, in the first embodiment, it is determined in step S19 of FIG. 5 whether or not the operation-signal generation unit can be incorporated to the central processing unit 10 on the basis of a single criterion, but the present invention is not limited thereto. For example, it is determined that the operation-signal generation unit for operating an actuator with an allowable delay time equal to or longer than a first predetermined reference time can be incorporated in the central processing unit 10, and that an operation-signal generation unit for operating an actuator with an allowable delay time shorter than a second predetermined reference time (for example, first reference time≥second reference time) cannot be incorporated in the central processing unit 10. That is, the determination can be made using a plurality of reference times. As a result, the central processing unit 10 includes a first operation-signal generation unit for operating the actuator with an allowable delay time equal to or longer than the first predetermined reference time among the actuators connected to the zone ECU 2. The zone ECUs 21 to 27 include a second operation-signal generation unit for operating the actuator with an allowable delay time shorter than the second predetermined reference time among the actuators connected to the zone ECUs 21 to 27.

In addition, in a case where there is a device determined not to be incorporated in the central processing unit 10 in the flow of FIG. 5 in the first embodiment, that is, in a case where the flow proceeds to step S20 of FIG. 5, the design change can be considered.

In the following second embodiment, a design method for considering a design change in a case where there is a device determined not to be incorporated in the central processing unit 10 will be specifically described.

Second Embodiment

Hereinafter, a specific design flow of a design method for a vehicle control system according to the present embodiment will be described with reference to FIGS. 9 to 14. Note that, the present embodiment will describe an example of determining whether or not a device is incorporated in a central processing unit from the viewpoint of a delay time (hereinafter, referred to as "activation delay time") when the network between a zone ECU and the central processing unit is activated. Note that, it can be configured that a design program for implementing the present design method is prepared, and the design program is executed using a computer.

Figure 9:
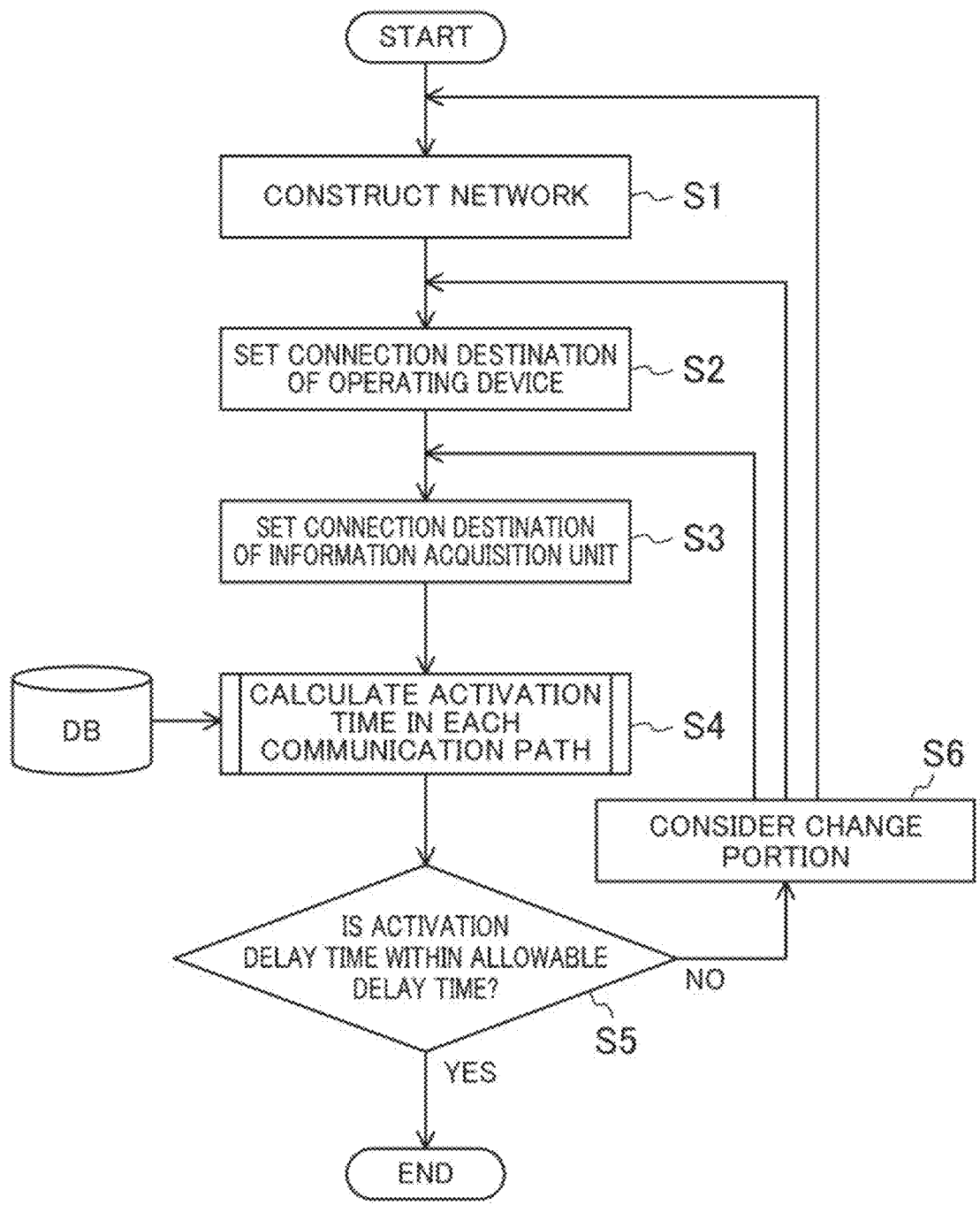
FIG. 9 is a flowchart illustrating a design method for a vehicle control system according to a second embodiment.
Figure 10:
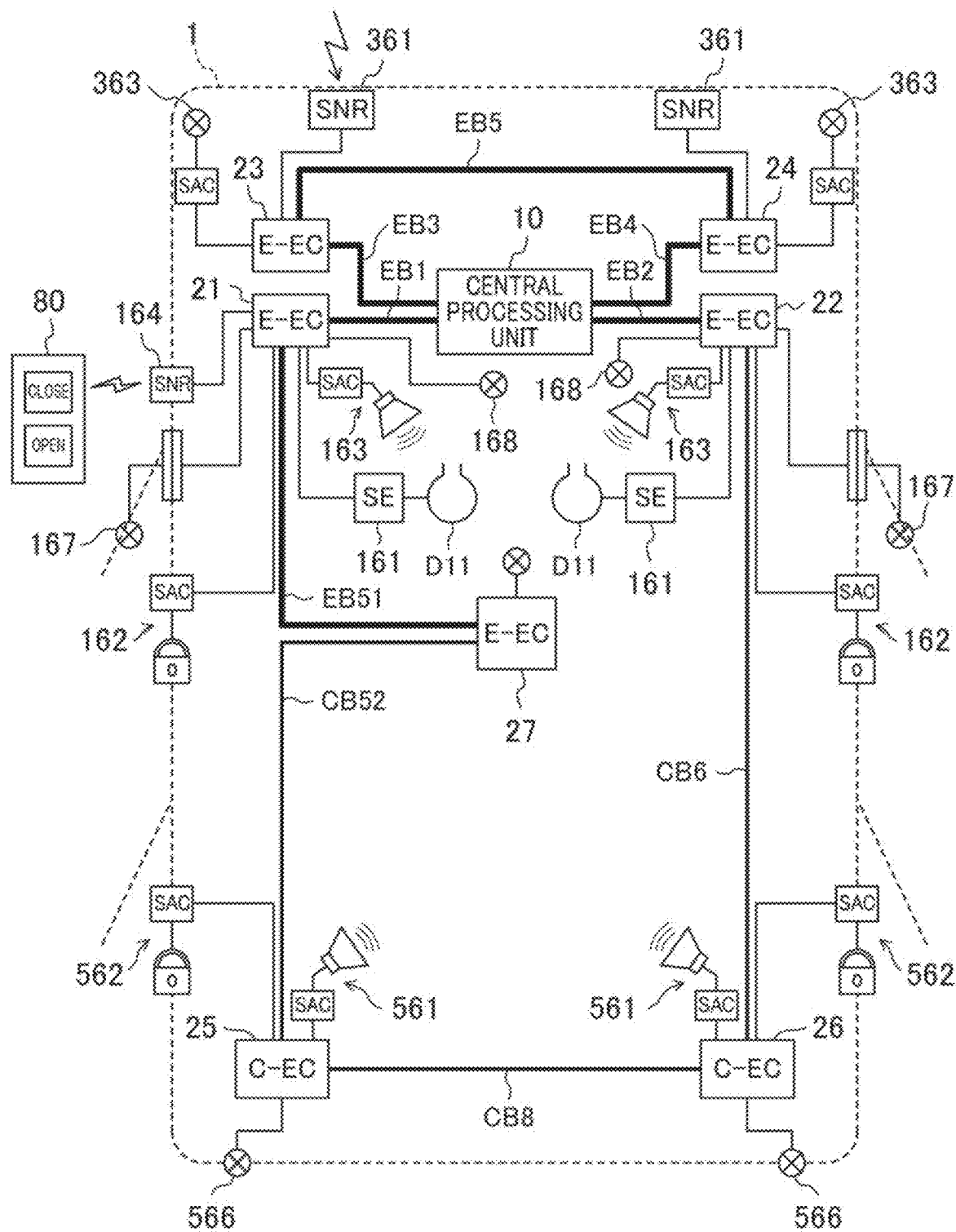
FIG. 10 is a diagram for explaining the design method for the vehicle control system according to the second embodiment.

Referring to FIG. 9, in step S1, a network serving as a base of an in-vehicle network is constructed. For example, first, as illustrated in FIG. 10, a trunk network indicated by thick lines and medium thick lines is constructed. Thereafter, a sub-network from each zone ECU 2 having a function as a network hub device in the trunk network is configured, so that the in-vehicle network spreading in a daisy chain layout from the central processing unit 10 is configured. Note that, in the embodiment, the description of the sub-network is omitted in order to avoid complication of the description.

In step S2, the connection destination of an in-vehicle device to be controlled (referred to as "operating device" in FIG. 9) is set. The reference of the connection destination of the operating device is not particularly limited. For example, the operating device is preferentially connected to, as a first connection destination, the zone ECU 2 installed at a position closest to the position where the operating device is disposed or an ECU (including a smart ECU) connected to the sub-network of the zone ECU 2.

In step S3, the connection destination of an information acquisition unit (for example, a sensor, a switch, or the like described above) is set. The reference of the connection destination of the information acquisition unit is not particularly limited. For example, the information acquisition unit is preferentially connected to, as a first connection destination, the zone ECU 2 installed at a position closest to the position where the information acquisition unit is disposed or an ECU (including a smart ECU) connected to the sub-network of the zone ECU 2.

In step S4, the activation time of each communication path is calculated first. Specifically, the communication path between the information acquisition unit such as a sensor or a switch and the in-vehicle device to be controlled (hereinafter, referred to as "operating device") is specified.

Figure 11:
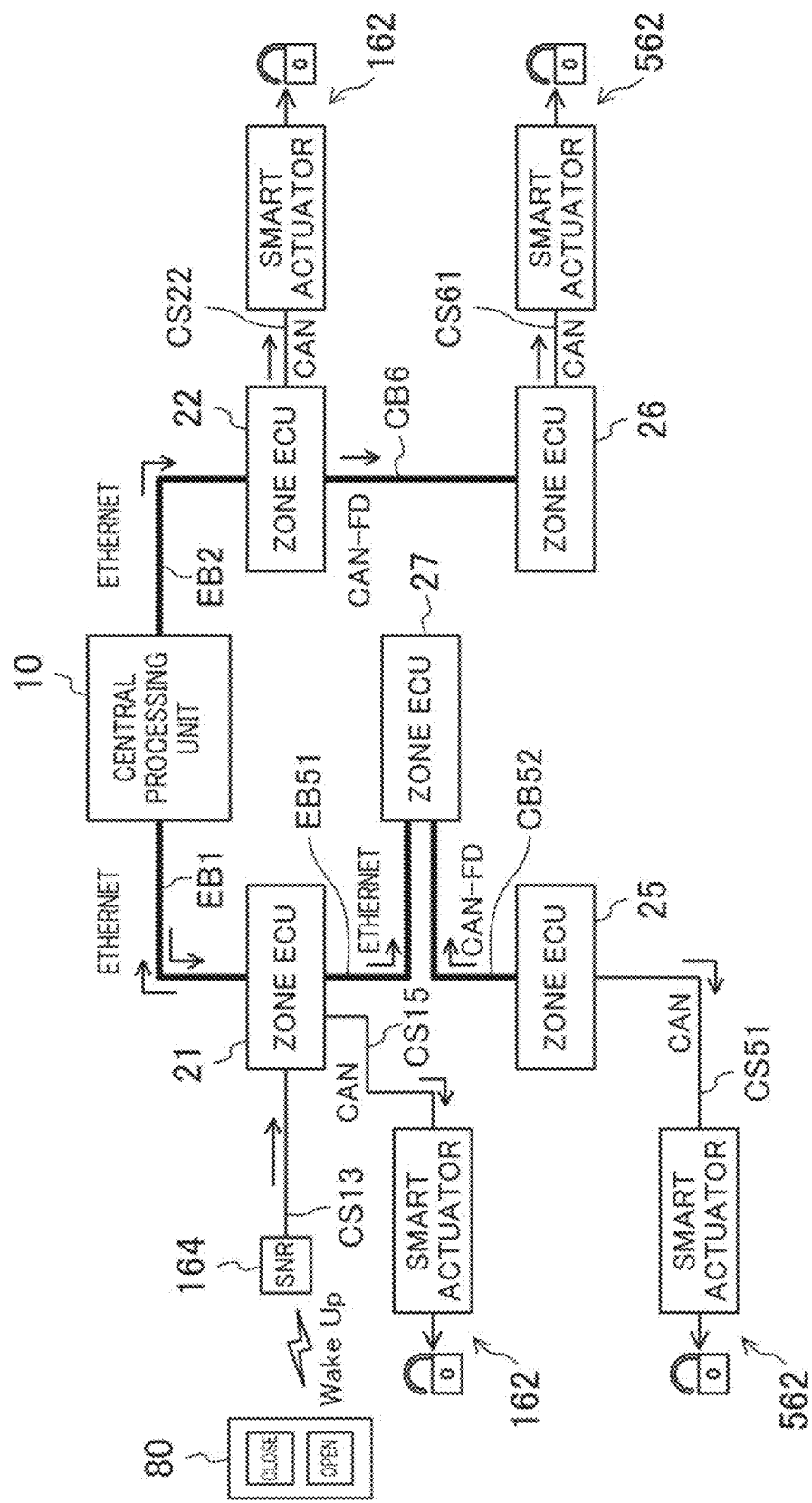
FIG. 11 is a diagram for explaining the design method for the vehicle control system according to the second embodiment.

FIG. 11 is obtained by extracting a network related to the keyless sensor 164 and the smart actuators 162 and 562 for locking and unlocking doors from the configuration of FIG. 10. FIG. 11 illustrates a case where "information acquisition unit" is the keyless sensor 164 that acquires information from a vehicle remote controller 80, and "operating device" is the smart actuators 162 and 562 for locking and unlocking doors.

In the case of the example illustrated in FIG. 11, a path from the keyless sensor 164 through the first zone ECU 21 via a LIN signal line to the central processing unit 10 via the Ethernet cable EB1 is specified as an input-side communication path. In addition, in the case of the example illustrated in FIG. 11, since four smart actuators 162 and 562 for locking and unlocking doors are mounted, four output-side communication paths are specified.

Specifically, a path from the central processing unit 10 through the first zone ECU 21 via the Ethernet cable EB1 to the smart actuator 162 via a CAN signal line CS15 is specified as a first output-side communication path. A path from the central processing unit 10 through the first zone ECU 21 via the Ethernet cable EB1, through the seventh zone ECU 27 via an Ethernet cable EB51, through the fifth zone ECU 25 via a CAN-FD cable CB52 to the smart actuator 562 via a CAN signal line CS51 is specified as a second output-side communication path. A path from the central processing unit 10 through the second zone ECU 22 via the Ethernet cable EB2 to the smart actuator 162 via a CAN signal line CS22 is specified as a third output-side communication path. A path from the central processing unit 10 through the second zone ECU 22 via the Ethernet cable EB2, through the sixth zone ECU 26 via the CAN-FD cable CB6 to the smart actuator 562 via a CAN signal line CS61 is specified as a fourth output-side communication path.

Next, the activation delay time in each communication path is calculated. For example, the activation delay time from when the network from the first zone ECU 21 to the central processing unit 10 is activated to when the central processing unit 10 is activated is calculated in the input-side communication path. In calculating the activation delay time, specific arithmetic processing such as simulation in which various parameters are set can be performed, or simple arithmetic processing can be performed using data registered in a database (denoted as "DB" in FIG. 9) in advance. The calculation of the activation delay time is repeated until the arithmetic processing in the input-side communication path and the output-side communication path is completed.

For example, the activation delay time from when the network from the central processing unit 10 to the first zone ECU 21 is activated to when the first zone ECU 21 is activated is calculated in the first output-side communication path. Similarly, the activation delay time (corresponding to the second activation time) from when the first zone ECU 21 and the seventh zone ECU 27 constituting the network from the central processing unit 10 to the fifth zone ECU 25 are sequentially activated to when the fifth zone ECU 25 is activated is estimated in the second output-side communication path. The activation delay time is similarly calculated in the third and fourth output-side communication paths. Note that in FIG. 9, the calculation of the activation delay time in each communication path can be performed in parallel or simultaneously.

Figure 12:
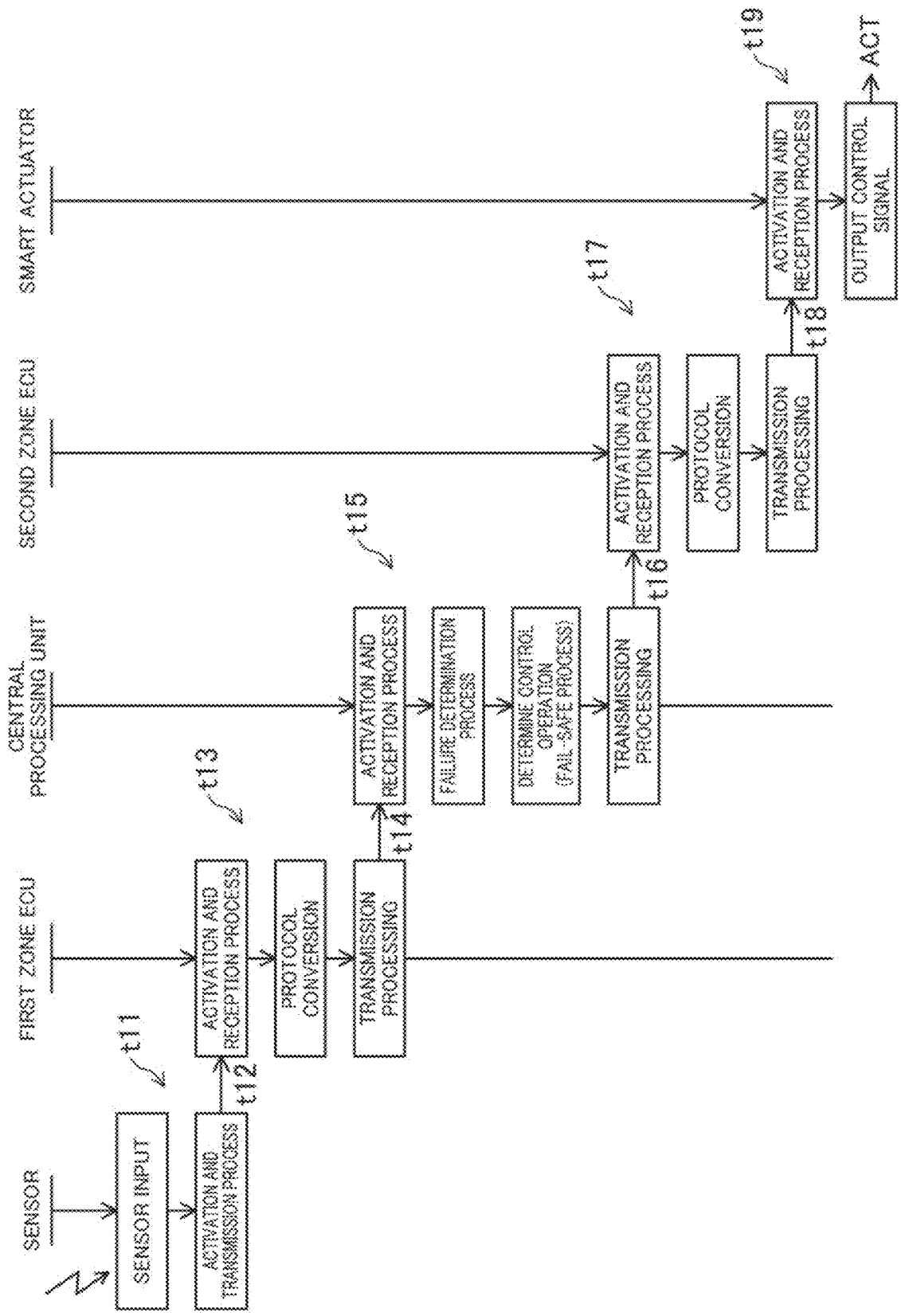
FIG. 12 is a diagram for explaining the design method for the vehicle control system according to the second embodiment.
Figure 13:
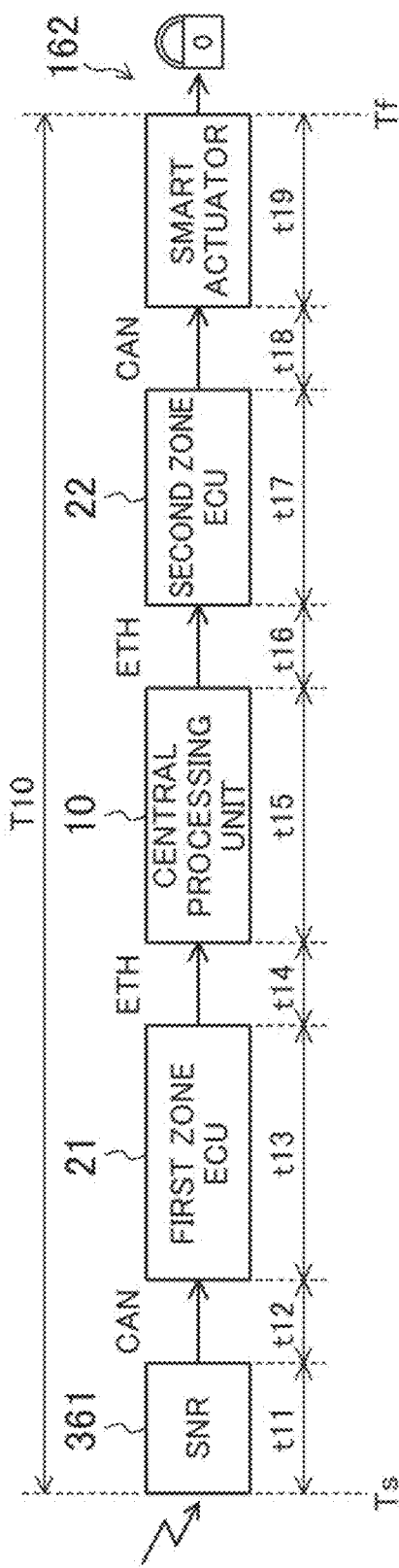
FIG. 13 is a diagram for explaining the design method for the vehicle control system according to the second embodiment.
Figure 14:
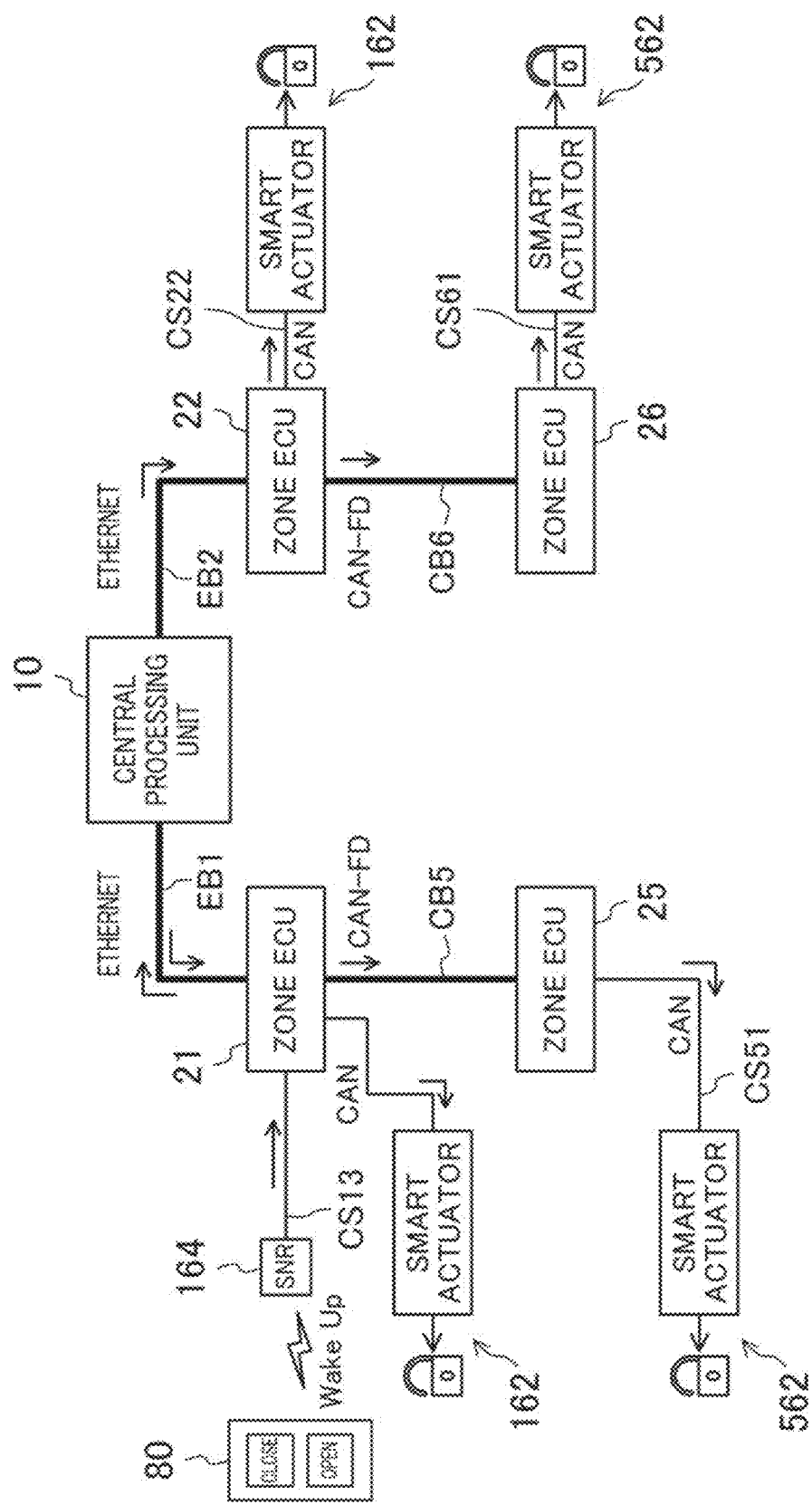
FIG. 14 is a diagram for explaining the design method for the vehicle control system according to the second embodiment.

FIGS. 12 and 13 are diagrams for explaining the activation delay time, and illustrate, as an example, a flow from the input of operation information for locking and unlocking from the remote controller to the keyless sensor 164 to the locking and unlocking of a door by the smart actuator 162 connected to the second zone ECU 22.

As illustrated in FIGS. 12 and 13, for example, when an unlocking operation signal is input to the keyless sensor 164, an activation and transmission signal process is performed in the keyless sensor 164, and the unlocking operation signal is output to the first zone ECU 21. The unlocking operation signal is an example of an activation signal.

For example, the activation time of a transmission circuit that transmits an unlocking operation signal and a transmission delay time due to the transmission signal processing are generated as the activation delay time t1 in the keyless sensor 164 t12 is a communication delay time (corresponding to the activation delay time) in the communication path (the CAN signal line CS13) between the keyless sensor 164 and the first zone ECU 21.

Since "relay process" described above is performed in the first zone ECU 21, an activation time of the communication unit 120, a reception delay time due to a reception process, and a transmission delay time due to a transmission process to the central processing unit 10 are generated as the activation delay time t13. t14 is a communication delay time (corresponding to the activation delay time) in the communication path (the Ethernet cable EB1) between the first zone ECU 21 and the central processing unit 10.

In the central processing unit 10, an activation time of the central processing unit 10, a reception processing time related to reception of an Ethernet signal from the first zone ECU 21, and a reception processing time related to transmission of the Ethernet signal to the first zone ECU 21 and the second zone ECU 22 are generated as an activation delay time t15. The activation time of the central processing unit 10 includes, for example, an activation time of a physical layer (not illustrated) such as a PLL. The transmission delay time includes, for example, a coding processing time and a transmission processing time of a physical layer or the like. The reception delay time includes, for example, a reception processing time of a physical layer or the like and a subsequent decoding processing time. Note that the central processing unit performs a failure determination process and a control operation determination process (including a fail-safe process). Although these failure determination process and control operation determination process are not included in the communication delay time, for example, in a case where it takes more time for each process than the conventional ECU if these processes are incorporated in the central processing unit, the processing time can be included in the activation delay time. t16 is a communication delay time (corresponding to the activation delay time) in the communication path (the Ethernet cable EB2) between the central processing unit 10 and the second zone ECU 22.

Since "relay process" described above is performed in the second zone ECU 22, an activation time of a communication unit (corresponding to the communication unit 120 of the first zone ECU 21), the reception delay time due to the reception process, a protocol conversion time of a protocol conversion unit (corresponding to the protocol conversion unit 140 of the first zone ECU 21), and the transmission delay time due to the transmission process to the central processing unit 10 are generated as the activation delay time t17. t18 is a communication delay time (corresponding to the activation delay time) in the communication path (the CAN signal line CS22) between the second zone ECU 22 and the smart actuator 162.

When the smart actuator 162 receives an unlocking operation signal from the second zone ECU 22, a door is unlocked. In a case where any activation delay time t19 is generated in the process from when the unlocking operation signal is output from the second zone ECU 22 to when the smart actuator 162 unlocks a door, the activation delay time t19 can be added to the calculation result of the activation delay times t11 to t18.

As described above, in step S4 of FIG. 9, the activation delay time T10 from the time Ts when an unlocking operation signal is input to the keyless sensor 164 to the time Tf when a control signal is output from the smart actuator 162 is calculated. For example, the activation delay time T10 from when operation information for locking or unlocking is input from the remote controller to the keyless sensor 164 to when a door is locked or unlocked by the smart actuator 162 connected to the second zone ECU 22 is the sum of the activation delay times t11 to t19.

In step S4 of FIG. 9, the activation delay time is calculated for all the devices to be operated. For example, in the example of FIG. 11, the activation delay time in a case where an operation signal is input to the smart actuator 162 is calculated for each of the four smart actuators 162 and 562.

In the next step S5, the activation delay time T10 is compared with the allowable delay time of a door locking device. The allowable delay time is, for example, a time allowed for the in-vehicle device to be operated from when an activation signal is input to the information acquisition unit to when the zone ECU or the output circuit to which the in-vehicle device is connected outputs a control signal, and is set in advance in each in-vehicle device, for example. For example, in the case of the door locking device, the allowable delay time corresponds to the time allowed from when an operation signal is input from the remote controller 80 to the keyless sensor 164 to when a control signal is output to the smart actuators 162 and 562. In other words, the activation delay time T10 is a minimum required activation delay time in a case where the information acquisition unit is connected to any one of the zone ECUs 2 and the in-vehicle device to be operated (hereinafter, also referred to as "operating device") is connected to any one of the zone ECUs 2. Consequently, in step S5, the activation delay time T10 is set as a predetermined reference time, and the activation delay time T10 is compared with the allowable delay time of the operating device.

Then, when the activation delay times of all the smart actuators 162 and 562 are within the allowable delay time (YES in step S5), the design process for the smart actuators 162 and 562 ends.

On the other hand, when the activation delay times of the smart actuators 162 and 562 exceed the allowable delay time (NO in step S5), the flow proceeds to step S6.

In step S6, a design change portion is considered. For example, it is considered that the connection destination of the information acquisition unit and/or the operating device is changed. In other words, the operation of determining the connection destination of the information acquisition unit and/or the connection destination of the in-vehicle device from the zone ECUs 2 such that the total time of the first activation time and the second activation time is less than the predetermined delay time is performed. In the above example, the first activation time is a time from when an operation signal is input from the remote controller 80 to the keyless sensor 164 serving as the information acquisition unit to when the central processing unit 10 is activated. In addition, the second activation time is a time from the central processing unit 10 to when the zone ECU 2 to which the door locking device serving as the operating device is connected or the control circuit of the door locking device is activated. For example, in the network configuration of FIG. 11, in a case where the activation delay time of the smart actuator 562 connected to the fifth zone ECU 25 is NG, it is possible to attempt to connect the smart actuator 562 connected to the fifth zone ECU 25 to the first zone ECU 21. In a case where the connection is changed, for example, the processes of steps S4 and S5 in FIG. 9 can be performed again.

Furthermore, for example, in the network configuration of FIG. 11, in a case where the activation delay time of the smart actuator 562 connected to the fifth zone ECU 25 is NG, the network configuration can be changed. For example, FIG. 14 (corresponding to the network configuration of FIG. 1) illustrates an example in which the network configuration is changed from that of FIG. 11. In this manner, the activation delay time can be shortened by reducing the number of zone ECUs interposed between the central processing unit 10 and the zone ECU 2 and/or changing the communication protocol for connecting the central processing unit 10 and the zone ECU 2. Note that, in the case of changing the network configuration of FIG. 11 to the network configuration of FIG. 14, the configuration of the trunk network is changed. On the other hand, the trunk network is a base network, and in general, a large number of networks (including daisy chain networks) are also configured under the trunk network and thus it is preferable that the network underlying the zone ECU 2 be changed first without changing the trunk network.

As described above, according to the present embodiment, the first activation time from when each network from a predetermined zone ECU (hereinafter, referred to as "first zone ECU") that receives an activation signal from the information acquisition unit out of the zone ECUs 2 toward the central processing unit 10 is sequentially activated to when the central processing unit 10 is activated is calculated. In addition, the second activation time from when each network toward a predetermined zone ECU (hereinafter, referred to as "second zone ECU") that outputs a control signal to an in-vehicle device operating in response to an activation signal from the central processing unit 10 is sequentially activated to when the second zone ECU is activated is calculated. The connection destination of the information acquisition unit, the connection destination of the in-vehicle device, and/or the network path are determined so that the total time of the first activation time and the second activation time is less than the predetermined allowable delay time. Here, the network path includes a network path from the first zone ECU to the central processing unit 10 and a network path from the central processing unit 10 to the second zone ECU.

As a result, it is possible to configure an in-vehicle network reflecting an activation delay in a complicated network system in which a plurality of communication protocols are mixed and different communication protocols are connected in a daisy chain layout. Furthermore, as in the above embodiments, by providing the allowable delay time, the configuration of the in-vehicle network and the connection destination of the in-vehicle device (including the information acquisition unit and the operating device) can be roughly determined before complicated arithmetic processing or the like is performed. Note that, in the present disclosure, the zone ECU is a concept including a smart ECU connected to the zone ECU 2 in addition to the zone ECU 2 described in the above embodiment.

Furthermore, in the present embodiment, the vehicle 1 is divided into a plurality of (seven in the present embodiment) zones, the zone ECU 2 is provided in each zone, and these zone ECUs 2 are connected to construct a trunk network. Each zone ECU 2 includes a communication port, and the communication port is connected to an in-vehicle device using a connector or the like. As a result, the activation delay time between each zone ECU 2 and the central processing unit 10 can be obtained in advance by simulation or the like. As a result, in determining the connection destination of the information acquisition unit and the connection destination of the operating device, it is possible to determine a zone ECU that is inappropriate as the connection destination in advance, and the design efficiency can be improved.

Note that the technology disclosed herein is not limited to the embodiments described above, and various changes and substitutions can be made without departing from the gist of the claims. In addition, the embodiments described above are merely examples, and the scope of the present disclosure should not be interpreted in a limited manner. The scope of the present disclosure is defined by the claims, and all modifications and changes falling within the equivalent scope of the claims are within the scope of the present disclosure.

INDUSTRIAL APPLICABILITY

The technology disclosed herein is useful for designing a vehicle control system.

The invention claimed is:

1. A design method for a vehicle control system including a plurality of zone ECUs each of which is disposed in each predetermined zone of a vehicle and a central processing unit that integrally controls the zone ECUs, where a method of determining whether an operation-signal generation unit that generates an operation signal for operating each actuator installed in the vehicle on a basis of operation information from an information acquisition unit installed in the vehicle is provided in a first zone ECU to which an actuator to be operated is connected among the zone ECUs or in the central processing unit, the method of determining comprising designing in such a manner that an allowable delay time that is allowed from when the operation information is input to the information acquisition unit to when a control signal of the actuator to be operated is output is set in the actuator to be operated, in a case where the allowable delay time is equal to or greater than a predetermined reference time, the operation-signal generation unit of the actuator to be operated is provided in the central processing unit, and in a case where the allowable delay time is less than the predetermined reference time, the operation-signal generation unit of the actuator to be operated is provided in the first zone ECU.

2. The design method for a vehicle control system according to claim 1, wherein the predetermined reference time includes a time required for protocol conversion between a communication protocol used for communication between the actuator and each of the zone ECUs and a communication protocol used for communication between each of the zone ECUs and the central processing unit.

3. A vehicle control system comprising a plurality of zone ECUs each of which is disposed in each predetermined zone of a vehicle and to each of which an actuator for operating the vehicle is connected and a central processing unit that integrally controls the zone ECUs, the vehicle control system controlling an operation of the actuator on a basis of operation information from an information acquisition unit installed in the vehicle,
wherein an allowable delay time that is allowed from when the operation information is input to the information acquisition unit to when a control signal of the actuator is output is set in the actuator,
the central processing unit includes a first operation-signal generation unit that operates an actuator with the allowable delay time of a predetermined first reference time or longer among the actuators connected to the zone ECUs, and
each of the zone ECUs includes a second operation-signal generation unit that operates an actuator with the allowable delay time less than a second predetermined reference time among the actuators connected to the zone ECUs.

4. A non-transitory computer readable storage device having computer readable instructions that when executed by circuitry cause the circuitry to:
control a plurality of zone electronic control circuits, each of which is disposed in each predetermined zone of a vehicle and to each of which an actuator for operating the vehicle is connected and a central processor that integrally controls the zone electronic control circuits, by controlling an operation of the actuator on a basis of operation information from an information acquisition circuit in the vehicle,
wherein an allowable delay time that is allowed from when the operation information is input to the information acquisition circuit to when a control signal of the actuator is output is set in the actuator,
the central processor includes a first operation-signal generation circuit that operates an actuator with the allowable delay time of a predetermined first reference time or longer among the actuators connected to the zone electronic control circuits, and
each of the zone electronic control circuits includes a second operation-signal generation unit that operates an actuator with the allowable delay time less than a second predetermined reference time among the actuators connected to the zone electronic control circuits.

* * * * *